United States Patent
Aguilar et al.

(10) Patent No.: US 9,346,075 B2
(45) Date of Patent: May 24, 2016

(54) MODULAR JETTING DEVICES

(75) Inventors: Stanley Cruz Aguilar, El Cajon, CA (US); Mani Ahmadi, Oceanside, CA (US); Stephen Russell des Jardins, Encinatas, CA (US); Erik Fiske, Carlsbad, CA (US); Mark Meier, Encinitas, CA (US); Horatio Quinones, San Marcos, CA (US); Thomas Ratledge, San Marcos, CA (US); Robert James Wright, Carlsbad, CA (US)

(73) Assignee: Nordson Corporation, Westlake, OH (US)

( * ) Notice: Subject to any disclaimer, the term of this patent is extended or adjusted under 35 U.S.C. 154(b) by 291 days.

(21) Appl. No.: 13/219,064

(22) Filed: Aug. 26, 2011

(65) Prior Publication Data

US 2013/0048759 A1    Feb. 28, 2013

(51) Int. Cl.
  *B05B 1/30*   (2006.01)
  *B05C 5/02*   (2006.01)
  *B05C 11/10*  (2006.01)

(52) U.S. Cl.
  CPC .............. *B05C 5/0225* (2013.01); *B05B 1/304* (2013.01); *B05B 1/3046* (2013.01); *B05C 5/0291* (2013.01); *B05C 11/1002* (2013.01); *B05C 11/1034* (2013.01)

(58) Field of Classification Search
  CPC .. B05C 11/103; B05C 11/1034; B05C 11/10; B05C 11/10342; B05B 1/3046; B05B 1/304; F02M 51/0639; F02M 51/0642; F02M 51/0657; F02M 51/0685
  USPC ............ 239/583, 584, 71, 585.3; 251/129.14, 251/129.6, 63.6, 323, 333, 122
  See application file for complete search history.

(56) References Cited

U.S. PATENT DOCUMENTS

| 574,102 A | 12/1896 | Miller |
| 3,211,416 A | 10/1965 | Billeter et al. |

(Continued)

FOREIGN PATENT DOCUMENTS

| CN | 1057028 C | 12/1991 |
| CN | 1847707 A | 10/2006 |

(Continued)

OTHER PUBLICATIONS

USPTO, Office Action issued in U.S. Appl. No. 13/283,702 dated Dec. 13, 2012.
European Patent Office, Search Report issued in European Patent Application No. EP 12 18 9794 dated Jul. 24, 2013.
All-Ring Co., All Ring Dual Solenoid Jet Valve 2006.

(Continued)

*Primary Examiner* — Len Tran
*Assistant Examiner* — Alexander Valvis
(74) *Attorney, Agent, or Firm* — Baker & Hostetler LLP

(57) ABSTRACT

Modular devices for jetting a fluid material and components for modular jetting devices. The devices may include a pressurized air or positive displacement pump fluid supply module to supply a fluid module inlet. A syringe may feed material through a check valve to a positive displacement pump, which feeds material through another check valve to the fluid module. Inside the fluid module is a valve element moved to contact a valve seat and jet a droplet of material by contact between an external drive pin and a movable element of the fluid module. Either a piezoelectric actuator, a pneumatic actuator, or another actuator may move the drive pin. A controller may coordinate the supply of fluid from the positive displacement pump with the rate at which material is jetted. The fluid module and positive displacement pump are easily removable from the jetting device.

14 Claims, 25 Drawing Sheets

(56) References Cited

U.S. PATENT DOCUMENTS

| | | | |
|---|---|---|---|
| 3,366,288 | A | 1/1968 | Joel et al. |
| 4,095,722 | A | 6/1978 | Miller |
| 4,116,389 | A * | 9/1978 | Furtah et al. ............... 239/132.5 |
| 4,383,264 | A | 5/1983 | Lewis |
| 4,712,576 | A | 12/1987 | Ariizumi et al. |
| 4,741,360 | A * | 5/1988 | Affeldt et al. ................. 137/510 |
| 4,763,560 | A | 8/1988 | Sasaki |
| 4,830,286 | A * | 5/1989 | Asslaender et al. ....... 239/585.3 |
| 4,930,669 | A | 6/1990 | Dickau et al. |
| 5,074,443 | A | 12/1991 | Fujii et al. |
| 5,186,393 | A * | 2/1993 | Yie ................................ 239/583 |
| 5,199,607 | A | 4/1993 | Shimano |
| 5,205,439 | A | 4/1993 | Sturm |
| 5,320,250 | A | 6/1994 | La et al. |
| 5,405,050 | A | 4/1995 | Walsh |
| 5,431,343 | A | 7/1995 | Kubiak et al. |
| 5,447,254 | A | 9/1995 | Hoover et al. |
| 5,462,199 | A | 10/1995 | Lenhardt |
| 5,484,104 | A * | 1/1996 | Kukler ............................. 239/87 |
| 5,505,777 | A | 4/1996 | Ciardella et al. |
| 5,593,290 | A | 1/1997 | Greisch et al. |
| 5,711,989 | A | 1/1998 | Ciardella et al. |
| 5,720,417 | A | 2/1998 | Wurth et al. |
| 5,743,960 | A | 4/1998 | Tisone |
| 5,747,102 | A | 5/1998 | Smith et al. |
| 5,913,455 | A | 6/1999 | La et al. |
| 5,927,329 | A * | 7/1999 | Yie .......................... 137/624.13 |
| 6,032,832 | A | 3/2000 | Dority et al. |
| 6,060,125 | A | 5/2000 | Fujii |
| 6,082,605 | A | 7/2000 | Farnworth |
| 6,164,568 | A | 12/2000 | Muller et al. |
| 6,173,864 | B1 | 1/2001 | Reighard et al. |
| 6,253,957 | B1 | 7/2001 | Messerly et al. |
| 6,267,266 | B1 | 7/2001 | Smith et al. |
| 6,270,019 | B1 | 8/2001 | Reighard |
| 6,291,016 | B1 | 9/2001 | Donges et al. |
| 6,325,271 | B1 | 12/2001 | Farnworth |
| 6,329,013 | B1 | 12/2001 | Putt |
| 6,350,494 | B1 | 2/2002 | Farnworth |
| 6,354,471 | B2 | 3/2002 | Fujii |
| 6,415,995 | B1 | 7/2002 | Enderle et al. |
| 6,416,294 | B1 | 7/2002 | Zengerle et al. |
| 6,450,416 | B1 | 9/2002 | Berg et al. |
| 6,537,505 | B1 | 3/2003 | LaBudde et al. |
| 6,557,452 | B1 | 5/2003 | Morroney et al. |
| 6,562,406 | B1 | 5/2003 | Chikahisa et al. |
| 6,601,784 | B2 | 8/2003 | Muller-Girard, Jr. et al. |
| 6,622,983 | B2 * | 9/2003 | Hall .................................. 251/62 |
| 6,669,057 | B2 | 12/2003 | Saidman et al. |
| 6,758,837 | B2 | 7/2004 | Peclat et al. |
| 6,805,308 | B2 | 10/2004 | Kweon et al. |
| 6,915,928 | B2 | 7/2005 | Brooks |
| 6,968,856 | B1 * | 11/2005 | Goza ............................. 137/488 |
| 7,018,477 | B2 | 3/2006 | Engel |
| 7,104,768 | B2 | 9/2006 | Richter et al. |
| 7,131,555 | B2 | 11/2006 | Maruyama et al. |
| 7,296,707 | B2 | 11/2007 | Raines et al. |
| 7,490,735 | B2 | 2/2009 | Raines et al. |
| 7,694,855 | B2 * | 4/2010 | Chastine et al. ........... 222/146.5 |
| 7,694,857 | B1 | 4/2010 | Fugere |
| 7,713,034 | B2 | 5/2010 | Ogawa |
| 7,762,088 | B2 * | 7/2010 | Fiske et al. ..................... 62/3.64 |
| 7,767,266 | B2 | 8/2010 | Holm et al. |
| 7,789,327 | B2 | 9/2010 | Micheli et al. |
| 7,900,800 | B2 | 3/2011 | Hassler, Jr. et al. |
| 7,939,125 | B2 | 5/2011 | Abernathy et al. |
| 7,980,483 | B2 * | 7/2011 | Stretch ............................... 239/1 |
| 8,056,827 | B2 | 11/2011 | Xu |
| 8,074,467 | B2 * | 12/2011 | Fiske et al. ....................... 62/389 |
| 8,136,705 | B2 | 3/2012 | Tracy et al. |
| 8,181,468 | B2 | 5/2012 | Fiske et al. |
| 8,201,716 | B2 | 6/2012 | Chastine et al. |
| 8,215,535 | B2 | 7/2012 | Holm et al. |
| 8,257,779 | B2 | 9/2012 | Abernathy et al. |
| 8,262,179 | B2 | 9/2012 | Ikushima |
| 8,322,575 | B2 | 12/2012 | Riney |
| 8,708,246 | B2 | 4/2014 | Dunlap et al. |
| 8,757,511 | B2 | 6/2014 | Ciardella et al. |
| 9,233,388 | B2 | 1/2016 | Saidman et al. |
| 9,254,642 | B2 | 2/2016 | Ciardella et al. |
| 2002/0017238 | A1 | 2/2002 | Shinozaki et al. |
| 2002/0112821 | A1 | 8/2002 | Inaba et al. |
| 2003/0000965 | A1 | 1/2003 | Bach et al. |
| 2003/0003027 | A1 | 1/2003 | Albert et al. |
| 2003/0132243 | A1 | 7/2003 | Engel |
| 2003/0185096 | A1 | 10/2003 | Hollstein et al. |
| 2004/0140371 | A1 | 7/2004 | Engel |
| 2005/0072815 | A1 | 4/2005 | Carew et al. |
| 2005/0236438 | A1 | 10/2005 | Chastine et al. |
| 2006/0077223 | A1 | 4/2006 | Shin et al. |
| 2006/0081807 | A1 | 4/2006 | Browne et al. |
| 2006/0097015 | A1 | 5/2006 | Riney |
| 2006/0147313 | A1 | 7/2006 | Zengerle et al. |
| 2006/0157517 | A1 | 7/2006 | Fiske et al. |
| 2007/0069041 | A1 | 3/2007 | Quinones et al. |
| 2007/0145164 | A1 * | 6/2007 | Ahmadi et al. ................ 239/583 |
| 2008/0006653 | A1 | 1/2008 | Dai et al. |
| 2008/0105703 | A1 | 5/2008 | Prentice et al. |
| 2008/0149691 | A1 | 6/2008 | Fujii |
| 2008/0169357 | A1 * | 7/2008 | Boecking ......................... 239/91 |
| 2008/0312025 | A1 | 12/2008 | Spickard |
| 2009/0004027 | A1 | 1/2009 | Ingenbleek et al. |
| 2009/0078720 | A1 | 3/2009 | Abernathy et al. |
| 2009/0095825 | A1 * | 4/2009 | Ahmadi et al. ................ 239/583 |
| 2009/0101669 | A1 | 4/2009 | Hassler, Jr. et al. |
| 2009/0115825 | A1 | 5/2009 | Peng et al. |
| 2009/0167818 | A1 | 7/2009 | Morita |
| 2010/0181337 | A1 | 7/2010 | Ikushima |
| 2010/0252576 | A1 | 10/2010 | Fiske et al. |
| 2010/0294810 | A1 | 11/2010 | Ikushima |
| 2011/0017841 | A1 | 1/2011 | Holm et al. |
| 2012/0286072 | A1 | 11/2012 | Saidman et al. |
| 2013/0048759 | A1 | 2/2013 | Aguilar et al. |
| 2013/0052359 | A1 | 2/2013 | Ahmadi et al. |
| 2013/0105597 | A1 | 5/2013 | Dunlap et al. |

FOREIGN PATENT DOCUMENTS

| | | |
|---|---|---|
| CN | 1849486 A | 10/2006 |
| CN | 1951797 A | 4/2007 |
| CN | 101073796 A | 11/2007 |
| CN | 201132141 Y | 10/2008 |
| CN | 101356014 A | 1/2009 |
| CN | 102029241 A | 4/2011 |
| DE | 1353104 A1 | 9/2001 |
| DE | 10010952 A1 | 9/2001 |
| EP | 0598182 A1 | 5/1994 |
| EP | 1353104 A1 | 10/2003 |
| EP | 1353304 A2 | 10/2003 |
| EP | 2143503 A1 | 1/2010 |
| EP | 2151282 A1 | 2/2010 |
| EP | 2267381 A2 | 12/2010 |
| JP | H5168995 A | 7/1993 |
| JP | H0768203 A | 3/1995 |
| JP | 2001113212 A | 4/2001 |
| JP | 2004031927 A | 1/2004 |
| JP | 2004225666 A | 8/2004 |
| KR | 100704286 | 3/2007 |
| WO | WO2005009627 A2 | 2/2005 |
| WO | 2008124770 A1 | 10/2008 |
| WO | WO2008126373 A1 | 10/2008 |

OTHER PUBLICATIONS

USPTO, Office Action issued in U.S. Appl. No. 13/219,070 dated Feb. 26, 2013.
USPTO, office action issued in U.S. Appl. No. 13/219,070 dated Jun. 20, 2013.
Chinese Application No. 201210306701: Chinese First Office Action dated Nov. 4, 2015, 10 pages.

* cited by examiner

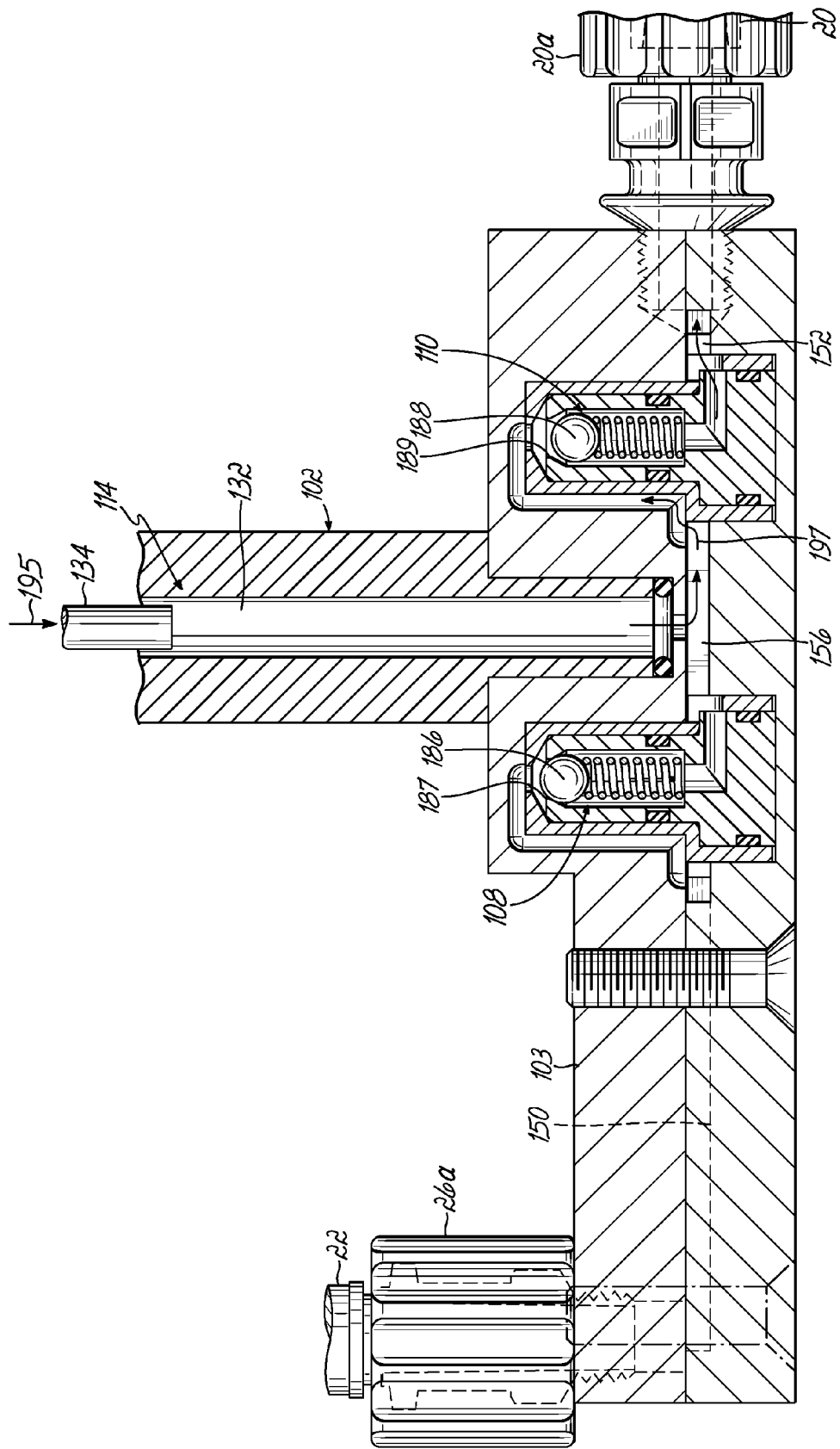

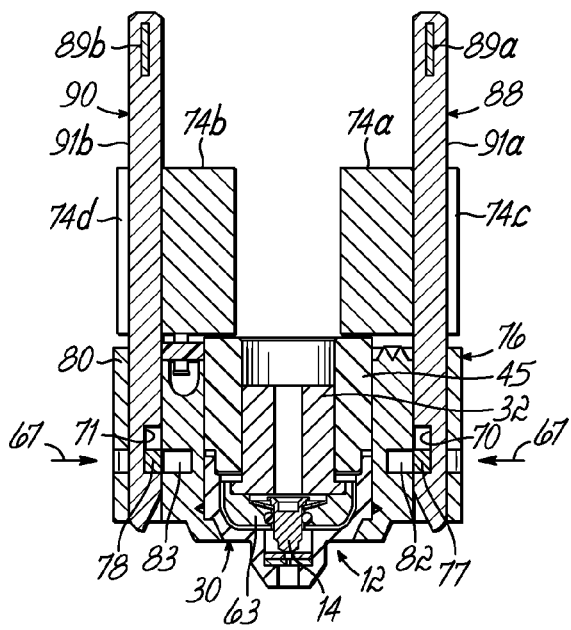
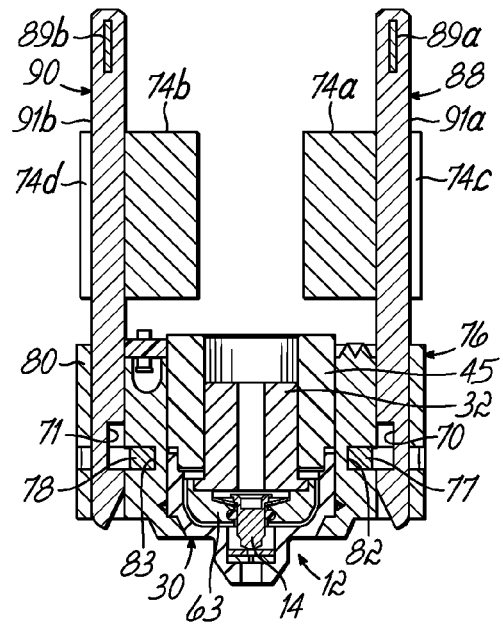
FIG. 11A  FIG. 11B
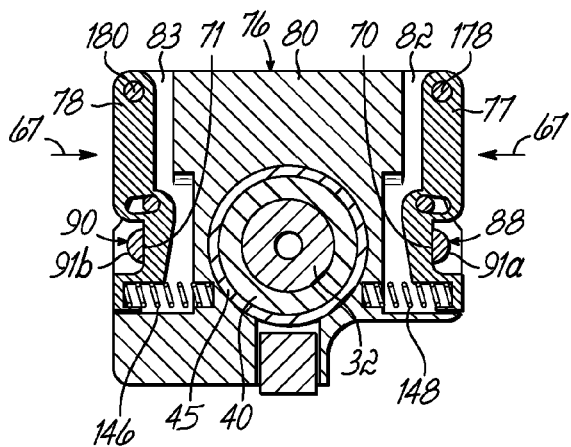
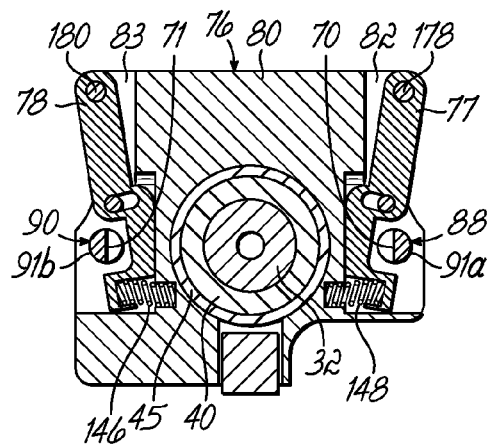
FIG. 12A  FIG. 12B

MODULAR JETTING DEVICES

CROSS-REFERENCE TO RELATED APPLICATIONS

This application is related to U.S. patent application Ser. No. 13/219,070, also filed on Aug. 26, 2011, and now U.S. Patent Application Publication No. 2013/0052359, published on Feb. 28, 2013, which is hereby incorporated by reference herein in its entirety.

BACKGROUND

The invention relates generally to the application of fluid materials and, in particular, to devices for use in jetting fluid materials.

Jetting devices may require different types of dispensing valves, or dispensing valve components, that are dedicated to different types of dispensing applications in electronic industry applications in which minute amounts of a fluid material is applied onto a substrate. A "jetting device" is a device which ejects, or "jets", a droplet of material from the dispenser to land on a substrate, wherein the droplet disengages from the dispenser nozzle before making contact with the substrate. Thus, in a jetting type dispenser, the droplet dispensed is "in-flight" between the dispenser and the substrate, and not in contact with either the dispenser or the substrate, for at least a part of the distance between the dispenser in the substrate. Numerous applications exist for jetting devices that dispense underfill materials, encapsulation materials, surface mount adhesives, solder pastes, conductive adhesives, and solder mask materials, fluxes, and thermal compounds. As the type of application for the jetting device changes, the type of jetting device must also adapt to match the application change.

One type of jetting device includes a needle with a tip configured to selectively engage a valve seat. During a jetting operation, the needle of the jetting device is moved relative to the valve seat by a driving mechanism. Contact between the tip of the needle and the valve seat seals off a discharge passage from a fluid chamber supplied with fluid material under pressure. Thus, to dispense droplets of the fluid material, the valve element is retracted from contact with the valve seat to allow a finite amount of the fluid material to flow through the newly formed gap and into the discharge passage. The tip of the needle is then moved rapidly toward the valve seat to close the gap, which generates pressure that accelerates the finite amount of fluid material through the discharge passage and causes a droplet of the material to be ejected, or jetted, from an outlet of the discharge passage.

Jetting devices are configured for controlled movements above the substrate and the fluid material is jetted to land on an intended application area of a substrate. By rapidly jetting the material "on the fly" (i.e., while the jetting device is in motion), the dispensed droplets may be joined to form a continuous line. Jetting devices may therefore be easily programmed to dispense a desired pattern of fluid material. This versatility has made jetting devices suitable for a wide variety of applications in the electronics industry. For example, underfill material can be applied using a jetting device to dispense fluid material proximate to one or more edges of the chip, with the material then flowing under the chip by capillary action.

In conventional jetting devices, the needle tip that contacts the valve seat is exposed to the jetted fluid material. Consequently, the needle must include various seals that provide fluid isolation of the driving mechanism for the needle from the fluid chamber in which the needle tip is located, while permitting the tip of the needle to contact the valve seat to cause fluid material jetting. Seals promote wear and friction, while the needle requires significant travel to develop enough velocity for the impact with the valve seat that generates the energy necessary for the droplet of fluid material to be jetted.

From time to time, it is necessary to clean the internal surfaces of jetting devices that are wetted with the fluid material being jetted. Because these internal surfaces are difficult to access with cleaning tools, conventional jetting devices also take a significant amount of time to clean. Disassembling and reassembling the components of conventional jetting devices is a difficult process that involves numerous tools. As a result of the complexity of jetting devices, disassembly and reassembly are lengthy procedures, even for technicians that are highly skilled.

While conventional jetting devices have proven adequate for their intended purpose, improved jetting devices are needed that address the need for less downtime in maintaining jetting devices, while introducing additional degrees of flexibility to enable the jetting devices to be relatively easily configured for a variety of jetting applications.

SUMMARY OF THE INVENTION

Subheadings are provided in the summary below to help guide the reader through some of the various embodiments of the invention.

Fluid Supply Modules

In one embodiment, a modular jetting device includes a fluid module having a fluid chamber, a fluid inlet to the fluid chamber, a fluid connection interface to connect the fluid inlet to an external supply of liquid material, a fluid outlet from the fluid chamber, and a valve seat positioned between the fluid inlet and the fluid outlet. The modular jetting device further includes a drive module configured to reciprocally move at least a portion of a valve element relative to the valve seat. The fluid interface permits different fluid supply modules to supply fluid to the fluid module. A first fluid supply module, which is connectable to the fluid connection interface, can be configured to use pressurized air to direct the fluid material to the fluid inlet of the fluid module. A second fluid supply module, which is alternatively connectable to the fluid connection interface, can include a positive displacement pump configured to pump the fluid material to the fluid inlet of the fluid module. Either the first supply module or the second fluid supply module, or another type of fluid supply module, is connected to the fluid connection interface.

Positive Displacement Pumps

A positive displacement pump may be used in certain embodiments of the invention. It may include a first piston pump and a second piston pump configured to supply the fluid material in a timed sequence to the fluid inlet of the fluid chamber. A first check valve may be positioned in a first flow path between the fluid inlet to the fluid chamber and the first piston pump. The first check valve can include a spring-loaded movable body that controls reverse flow from the fluid chamber to the first piston pump. A second check valve may be positioned in a second flow path between the fluid inlet to the fluid chamber and the second piston pump. The second check valve can include a spring-loaded movable body that controls reverse flow from the fluid chamber to the second piston pump.

A second set of check valves similar to the first and second check valves may be included in the positive displacement pump to control reverse flow between the first and second piston pumps and a fluid supply, such as a fluid-filled syringe. Specifically, a third check valve may be positioned in the first flow path between the fluid supply and the first piston pump. The first check valve may include a spring-loaded movable body that controls reverse flow of the fluid material from the first piston pump to the fluid supply. A fourth check valve may be positioned in the second flow path between the second piston pump and the fluid supply. The fourth check valve may include a spring-loaded movable body that controls reverse flow of the fluid material from second piston pump to the fluid supply. The third check valve in this second set opens and closes in conjunction with the first check valve and the fourth check valve in this second set opens and closes in conjunction with the second check valve to permit amounts of fluid material to be alternatingly pumped from the fluid supply to the fluid module by the first and second piston pumps.

Each of the piston pumps of the modular jetting device may include a piston cylinder, a piston disposed inside the piston cylinder, a motorized carriage configured to move the piston relative to the piston cylinder to intake the fluid material into the piston cylinder and to discharge the fluid material from the piston cylinder, and a gripper connected to the carriage to releasably connect the carriage with the piston of each pump. The grippers can be released from the pistons to permit the pumps to be easily removed.

The fluid module of the modular jetting device may include a fluid passageway coupling the fluid inlet with the fluid chamber. The modular jetting device may further include a diaphragm in communication with the fluid passageway and a load sensor coupled with the diaphragm. The diaphragm is configured to receive or sense a pressure from the fluid material flowing in the fluid passageway from the fluid inlet to the fluid chamber. The pressure received by the diaphragm is transferred as a force to a load sensor.

In one preferred embodiment where the positive displacement pump is used, a syringe that supplies the fluid is connected to a first check valve to the positive displacement pump which is connected by a second check valve to the fluid chamber.

Fluid Module Actuated by External Drive Pin

In another embodiment, a fluid module is provided for a jetting device having a drive pin external to the fluid module that is reciprocated by an actuator. The fluid module includes a nozzle with a fluid outlet, a module body, a valve seat, a movable element, and a valve element. The module body includes a first portion with a fluid inlet, a second portion configured to support the nozzle, and a fluid chamber. An opening of the valve seat communicates with the fluid outlet and a part of the movable element defines a boundary of the fluid chamber. The valve element may be enclosed within the fluid chamber and is attached to the movable element. Alternatively, the valve element and movable element may comprise a single element. The valve element is moved toward the valve seat by contact between the drive pin and the movable element.

The fluid module may further include a biasing element contacting the movable element and configured to apply an axial spring force to the movable element. The valve element and movable element are capable of moving away from the valve seat after contact by the drive pin and under the action of the axial spring force.

The first portion of the module body may include a fluid passageway coupling the fluid inlet with the fluid chamber. The fluid module may further include a diaphragm in communication with the fluid passageway. The diaphragm is configured to receive a pressure from a fluid material flowing in the fluid passageway from the fluid inlet to the fluid chamber and to transfer the pressure as a force to a load sensor.

In an alternative embodiment, the position of upper stop for the movable element and the spacing of the nozzle seat below the valve can be adjusted.

Coupling Mechanism for Fluid Module

In yet another embodiment, a modular jetting device includes an actuator body, a drive module extending from the actuator body, a fluid module, and a heat transfer member disposed at least partially about the fluid module. The fluid module has a fluid chamber, a fluid inlet to the fluid chamber, a valve element, a nozzle with a fluid outlet from the fluid chamber, and a valve seat positioned between the valve element and the nozzle. The fluid module is supported by the actuator body. The valve element is separate from the drive module and is configured to be reciprocally moved by the drive module relative to the valve seat. The modular jetting device further includes a coupling mechanism having at least one arm that couples the heat transfer member and the fluid module to the actuator body. The at least one arm is configured to be vertically moved between first and second positions. In the first position, the at least one arm couples the heat transfer member and the fluid module to the actuator body. In the second position, the at least one arm provides a non-contacting relationship between the heat transfer member and fluid module, and the actuator body, so that the heat transfer member and fluid module can be decoupled from the at least one arm and the actuator body.

The coupling mechanism of the modular jetting device may, for example, further include a manually actuatable lever connected to the at least one arm. The lever may be moved to move the at least one arm between the first and second positions. As another alternative, a threaded knob fixed to a threaded member that is threadably connected to the at least one arm can be rotated to move the at least one arm between the first and second positions.

The fluid chamber of the modular jetting device may have a wall which is configured to be reciprocally moved by the drive module. The reciprocating movement of the wall causes the valve element to reciprocally move relative to the valve seat.

Fluid Module Useable with Different Drive Modules

In yet another embodiment, a modular jetting device includes a fluid module including a fluid chamber, a fluid inlet to the fluid chamber, a fluid outlet, and a valve seat positioned between the fluid inlet and the fluid outlet, as well as a valve element that is reciprocally movable relative to the valve seat. The modular jetting device further includes a first drive module that can be utilized to cause movement of the valve element and a second drive module that can alternatively be utilized to cause movement of the valve element. The second drive module is configured to operate by a different motive force than the first drive module, and the modular jetting device can be configured using either the first drive module or the second drive module.

The first drive module of the modular jetting device may be a piezoelectric drive module and the second drive module of the modular jetting device may be an electro-pneumatic drive module.

Controller

In another embodiment, a modular jetting device includes a fluid module having a fluid chamber configured to contain a fluid material, a fluid inlet to the fluid chamber, a fluid outlet from the fluid chamber, and a valve seat positioned between the fluid inlet and the fluid outlet. The modular jetting device further includes a drive module configured to reciprocally move at least a portion of a valve element relative to the valve seat between an open position in which the portion of the valve element is retracted from the valve seat to permit the fluid material to be discharged from the fluid outlet and a closed position in which the valve element engages the valve seat to halt the flow of the fluid material from the fluid outlet. The modular jetting device further includes a fluid supply module connected to a fluid connection interface. The fluid supply module includes a positive displacement pump configured to pump fluid material to the inlet of the fluid chamber. A controller transmits a start time signal to the positive displacement pump indicating a start time for the positive displacement pump to pump fluid material to the inlet of the fluid chamber and a pumping flow rate signal used to compare actual flow rate to a desired flow rate and to make flow rate corrections. The controller concurrently transmits a start time signal to the drive module to move the valve element to the open position at a predetermined first delay period after the start time signal to start a dispensing operation and then repeatedly moving the valve element between the opened and closed positions during the dispensing operation and at a predetermined cycle rate that is correlated with the flow rate. The controller transmits an end time signal to the positive displacement pump to stop pumping fluid material to the inlet of the fluid chamber. The controller concurrently transmits an end time signal to the drive module causing the valve element to remain in the closed position at a predetermined second delay period after the end time to stop the dispensing operation.

The modular jetting device may further include a load sensor configured to measure pressure and communicate the pressure as the signals to the controller. The load sensor is coupled to a diaphragm that is in communication with a fluid passageway of the fluid module coupling the fluid inlet with the fluid chamber. The diaphragm is configured to receive a force from a fluid material flowing in the fluid passageway from the fluid inlet to the fluid chamber and to transfer the force to the load sensor.

The positive displacement pump may include first and second piston pumps configured to supply the fluid material in a timed sequence to the fluid inlet of the fluid chamber. The controller may be configured to respond to signals from the load sensor to control transitions between the first piston pump and the second piston pump.

Some Advantages of Modularity

The design architecture of the jetting devices of the various embodiments of the invention reduces maintenance downtime and improves flexibility and usability of a jetting device. Specifically, different component modules can be assembled based on application requirements. The modular design includes a wetted path segregated from the mechanical drive, which allows different mechanical drivers such as piezoelectric drive module, a pneumatic drive module, or an electromagnetic drive module to be used as different options. Thus, a drive module that is appropriate for the application and target sale price of the particular jetting device product model to the user can be selected. The modular design can also accommodate different fluid supply modules, again to optimize the jetting device for the application and target sale price to the user.

Due to the modularity provided the assembled components of the jetting device, the mechanical drive module for the jetting device includes no wetted parts. In other words, the fluid material that is dispensed by the jetting device is segregated and isolated from the drive module for the jetting device. The fluid module includes the wetted path for the dispensed fluid material but is constructed to separate the fluid material from the mechanical drive module. As a consequence, the jetting device is easier to assemble, disassemble, clean, and maintain. Components of the jetting device are readily interchangeable, which also simplifies assembly, cleaning, and maintenance and reduces downtime of the jetting device.

These improvements to conventional jetting devices limit the amount of fluid material in the wetted path and eliminate the sliding seal/friction/wear of a fluid seal, while enabling the striking mechanism to accelerate faster because the striking mechanism is outside of the fluid path and is therefore not influenced by fluid resistance to motion or the resistance of a fluid seal. The invention permits one fluid module to be easily interchange with a fluid module having different characteristics such as a different sized valve element and valve seat and/or a different size discharge orifice for the nozzle to promote optimal droplet size and separation from the nozzle during a jetting operation.

In that the pump can be easily removed, as noted above, this comprises a second wetted component, in addition to the fluid module, that can be easily removed for cleaning or maintenance, or replacement with a like or different fluid module.

BRIEF DESCRIPTION OF THE DRAWINGS

The accompanying drawings, which are incorporated in and constitute a part of this specification, illustrate exemplary embodiments of the invention and, together with a general description of embodiments of the invention given above, and the detailed description given below, serve to explain the principles of the embodiments of the invention.

FIG. 5C is a cross-sectional view similar to FIG. 5B in which the check valves associated with the second piston pump of the positive displacement pump are repositioned during a discharge cycle.

FIG. 11A is a view in cross section taken generally along line 11A-11A in FIG. 8A.

FIG. 11B is a view similar to FIG. 11A and taken generally along line 11B-11B in FIG. 8B.

FIG. 12A is a view in cross section taken generally along line 12A-12A in FIG. 8A.

FIG. 12B is a view similar to FIG. 12A and taken generally along line 12B-12B in FIG. 8B.

DETAILED DESCRIPTION

Figure 1:
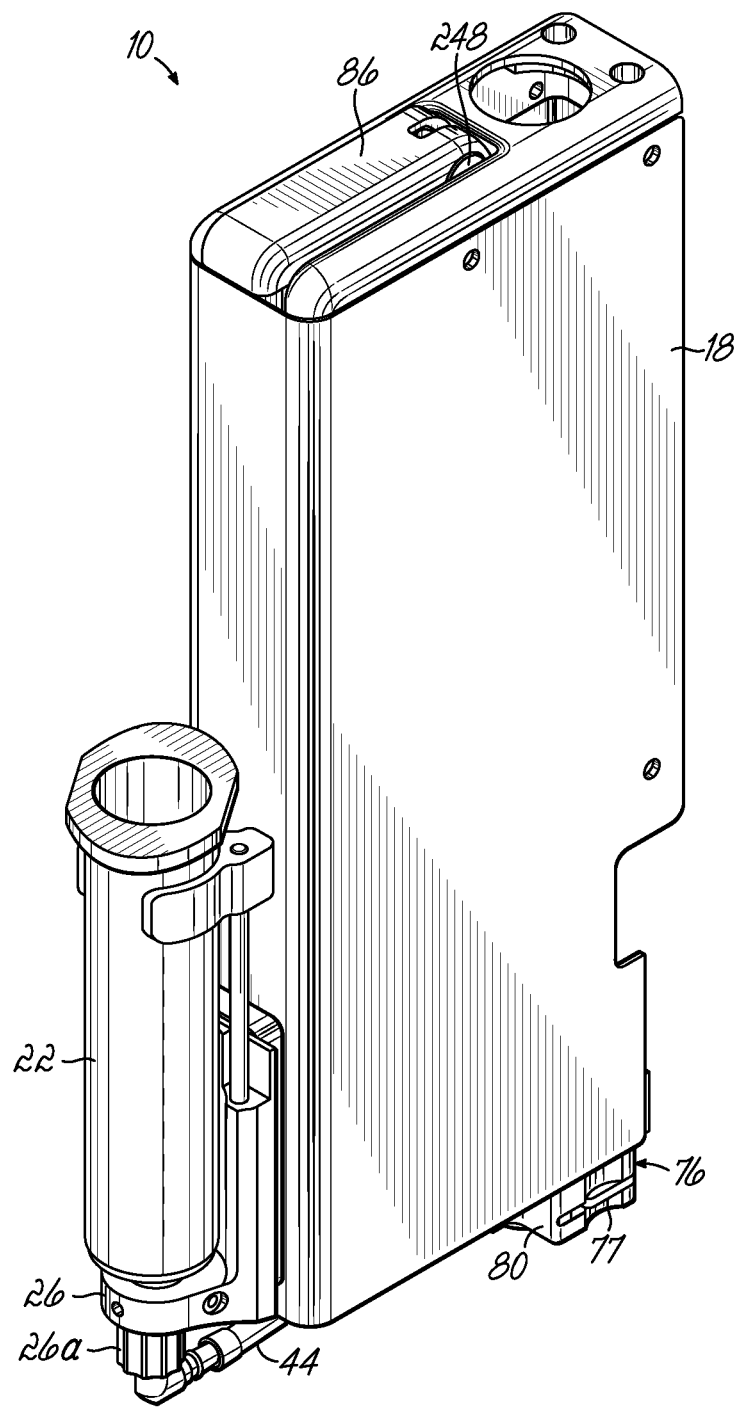
FIG. 1 is a perspective view of a modular jetting device in accordance with an embodiment of the invention.

Subheadings are provided in some sections below to help guide the reader through some of the various embodiments, features and components of the invention.

Generally, the embodiments of the invention are primarily directed to a dispensing valve in the form of a modular jetting device that is modular in a number of respects. One aspect is that the valve internal to the fluid module of the modular jetting device can be actuated by either a pneumatic drive module, an electromagnetic drive module, or a piezoelectric drive module. Another aspect is that fluid material can be supplied to the fluid chamber of the fluid module of the modular jetting device from fluid supply modules comprising either a pressurized syringe or positive displacement pump. Another aspect is that the modular jetting device includes a fluid module that seals all the wetted parts from the valve drive module. By the use of this design, the valve drive modules do not penetrate the fluid module, but rather engages a wall, or portion, of the fluid chamber module to reciprocate a valve element disposed within the fluid module. This enables fluid modules to be easily removed for cleaning or service, or interchanged with different fluid modules for different applications. For example, a fluid module best suited for the application of the dispensing of solder flux jetting can be used for that application, and a different fluid module best suited for the application of the dispensing of adhesive in an underfill application can be used for the different requirements of that application. In addition, a quick release coupling mechanism is provided that enables the fluid module to be quickly released from the modular jetting device for cleaning or service or to be interchanged with a different fluid module. In addition, spring biased grippers enable the pump to be easily removed as will be explained in more detail below.

With reference to FIGS. 1, 1A, 2, and 3 and in accordance with an embodiment of the invention, a dispensing valve in the representative embodiment of a modular jetting device 10 includes a fluid module 12 having a fluid connection interface 20, a valve element 14, a piezoelectric drive module 16, a movable needle or drive pin 36 coupled with the piezoelectric drive module 16, and an outer cover 18 housing the piezoelectric drive module 16. The outer cover 18 is composed of thin sheet metal and is fastened to the actuator body of the modular jetting device 10 by conventional fasteners. The primary support structure of the modular jetting device 10 is provided by a lower member 115, an upper member 113 and a support wall 111 that joins the upper and lower members 113, 115.

The modular jetting device 10 is supplied with pressurized fluid material from a syringe 22, which is supported by a syringe holder 26 mounted as an appendage to the outer cover 18. Generally, the fluid material in the syringe 22 may be any material or substance known by a person having ordinary skill in the art to be amenable to jetting and may include, but is not limited to, solder flux, solder paste, adhesives, solder mask, thermal compounds, oil, encapsulants, potting compounds, inks and silicones. The syringe 22 operates as a fluid supply module for the modular jetting device 10.

The modular jetting device 10 may be installed in a machine or system (not shown) for intermittently jetting amounts of a fluid material onto a substrate and may be moved relative to the substrate as the amounts of fluid material are jetted. The modular jetting device 10 may be operated such that a succession of jetted amounts of the fluid material are deposited on the substrate as a line of spaced-apart material dots. The substrate targeted by the modular jetting device 10 may support various surface mounted electronic components, which necessitates non-contact jetting of the minute amounts of fluid material rapidly and with accurate placement to deposit fluid material at targeted locations on the substrate. As detailed hereinbelow, the fluid module 12 is accessible for easy removal without tools from the bottom of the modular jetting device 10.

The Fluid Module

Figure 3:
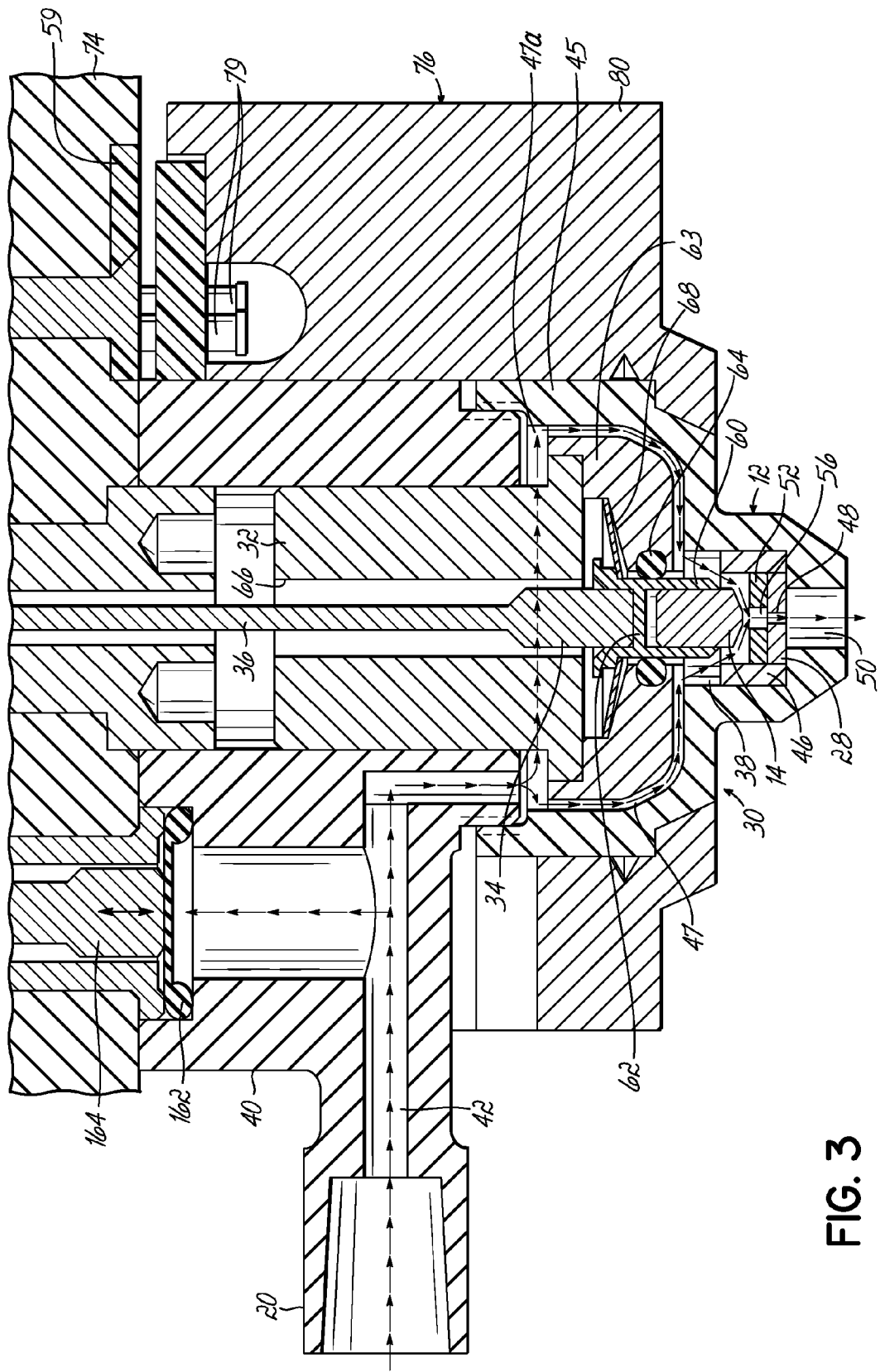
FIG. 3 is an enlarged cross-sectional view of a portion of FIG. 2.

As best visible in FIG. 3, the fluid module 12 includes a nozzle 28, a module body 30, and a fluid chamber 38 in communication with the fluid connection interface 20. A first section or portion 40 of the module body 30 includes a fluid inlet 42 and a passageway 47, 47a that couples the fluid inlet 42 in fluid communication with the fluid chamber 38. A fluid conduit 44 (FIGS. 1, 1A) extends from the syringe 22 to the fluid inlet 42 for placing the fluid module 12 in fluid communication with the fluid material contained inside the syringe 22 and for supplying the fluid material under pressure from the syringe 22 to the fluid connection interface 20. In this embodiment, the fluid conduit 44 is typically a length of tubing directly connecting the outlet of the syringe 22 with the fluid connection interface 20 without any intervening structure. In one embodiment, the fluid connection interface 20 includes a Luer fitting.

The syringe 22 may be configured to use pressurized air to direct the fluid material to flow toward the fluid inlet 42 and ultimately to the fluid chamber 38 of the fluid module 12. The pressure of the pressurized air, which is supplied to the head space above the fluid material contained in the syringe 22, may range from five (5) psig to sixty (60) psig. Typically, a wiper or plunger (not shown) is disposed between the air pressure in the head space and the fluid material level inside the syringe 22, and a sealing cap (not shown) is secured to the open end of the syringe barrel for supplying the air pressure.

A second portion 45 of the module body 30 is configured to support the nozzle 28. A centering piece 46 aligns a fluid outlet 48 in the nozzle 28 with a passageway 50 extending through the second portion 45 of the module body 30. A valve seat 52 is disposed between the fluid inlet 42 and the fluid outlet 48. The valve seat 52 has an opening 56 in fluid communication with the fluid outlet 48. The centering piece 46 maintains the fluid outlet 48 in nozzle 28, the passageway 50 in the second portion 45 of module body 30, and the opening 56 in valve seat 52 in a concentric alignment. These pieces 45, 46, 52 and 28 can be held in place in place by an adhesive bond between the components. Alternatively, some or all of the elements 45, 46, 52 and 28 could be made as a single unified piece. FIG. 2B shows an embodiment where all of the elements 45, 46, and 52 are made as a single unified piece 400, and nozzle 402 is attached to the unified piece 400 by, for example, adhesive or by a threaded connection.

The fluid module 12 further includes a strike plate in the form of a wall 62 of a movable element 60. A biasing element 68, which peripherally contacts the movable element 60, is configured to apply an axial spring force to the movable element 60.

A sealing ring 64 supplies a sealing engagement between an insert 63 and the exterior of the movable element 60. The part of the moveable element 60 which is below sealing ring, or O-ring, 64 defines a part of the boundary of the fluid chamber 38. The valve element 14 is attached to moveable element 60 and is located inside the fluid chamber 38 at a location between the wall 62 of the movable element 60 and the valve seat 52. Alternatively, the element 14 and movable element 16, including strike plate 62, may be made as a single unified piece, as shown in FIG. 2C.

A third portion 32 of the module body may be attached to the top of insert 63 by a friction fit. The second portion 45 of the module body is attached by a friction fit to the first portion 40 of the module body to enclose all the other components of the fluid module. Namely, once first portion 40 and second portion 45 are pressed together they enclose these parts of the fluid module: nozzle 28, valve seat 52, centering piece 46, valve element 14, movable element 60, sealing ring 64, biasing element 68, insert 63 and third portion 32 of the module body. Thus, in the preferred embodiment, the fluid module is comprised of elements 45, 40, 28, 52, 46, 14, 60, 64, 68, 63 and 32.

While certain of the components of the fluid module have been described as being connected by friction fit, the friction fits between these components could be replaced by threads to permit the components to be disassembled and reassembled.

In the assembled position described above and shown in FIG. 3, the passageways 47 and 47a that couple the fluid inlet 42 in fluid communication with the fluid chamber 38 are provided as follows. Annular passageway 47a is created by a space provided between first portion 40 and third portion 32 of module body 30. Passageway 47 is provided by grooves or channels formed on the outside of insert 63. When insert 63 is press fit into second portion 45 of the module body 30, the grooves on the exterior of insert 63 and the interior surface of second portion form passageways 47. In embodiments where the insert 33 is threadably connected to portion 45, a hole could be drilled through insert 33 to provide a flow passage between fluid inlet 42 and fluid chamber 38.

Figure 3A:
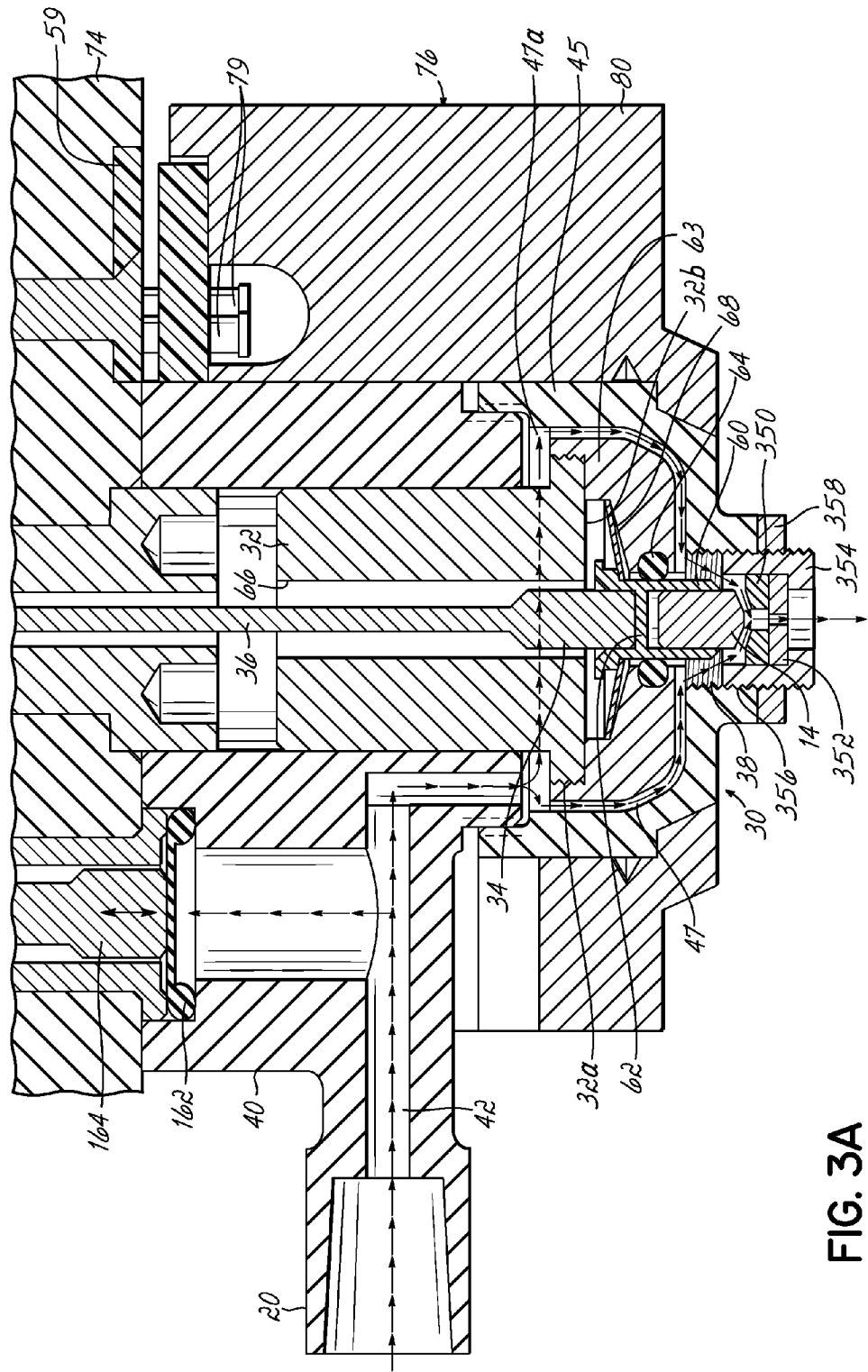
FIG. 3A shows an alternative embodiment.

In an alternative embodiment of the fluid module shown in FIG. 3A, third portion 32 is threaded into insert 63 by means of threads 32a. This threaded engagement permits the position of the lower surface 32b, of third portion 32, which is the upper stop for movable element 60, to be adjusted. The greater the distance the surface 32b is positioned above biasing element 68, the greater the stroke of the valve 14. In addition, this embodiment permits the position of valve seat 350 to be adjusted. Valve seat 350 and nozzle 352 are retained in a retainer cup 354 which is threaded at threads 356 into the second portion 45. The further retainer cup 354 is threaded up into second portion 45, the closer the valve seat 350 is positioned relative to the valve element 14. A lock nut 358 is provided to fix the position of valve seat 350 relative to valve element 14 once the retainer cup 354 has been threaded the desired distance into second portion 45.

Actuation of the Fluid Module by an External Drive Pin

The drive pin 36 projects through a bore 66 in the third portion 32 of the fluid module body 30. The tip 34 of the drive pin 36 is located adjacent to the wall 62 of the movable element 60 and on an opposite side of the wall 62 from the valve element 14.

While the valve element 14 is exposed to the fluid material contained inside the fluid chamber 38, the bore 66 containing the drive pin 36 is isolated from the fluid material in fluid chamber 38 so that the drive pin 36 is not wetted by the fluid material. As a result, the construction of the modular jetting device 10 can omit the conventional fluid seals that permit powered motion of the drive pin 36 while isolating the driving or actuation mechanism (e.g., piezoelectric drive module 16) for the drive pin 36 from the fluid material in the fluid chamber 38.

The drive pin 36 is indirectly coupled with the valve element 14 and operates as a component of the piezoelectric drive module 16 or other drive module. The drive pin 36 and valve element 14 jointly cooperate to dispense fluid material by jetting from the modular jetting device 10. When the drive pin 36 is moved to cause the valve element 14 to contact the valve seat 52, the tip 34 of the drive pin 36 operates much like the operation of a hammer to by striking the wall 62 of the movable element 60 to transfer its force and momentum to the wall 62, which in turn causes the valve element 14 to rapidly strike the valve seat 52 and jet a droplet of material from the jetting device. Specifically, the valve element 14, which is not directly connected with the drive pin 36, is configured to be moved into contact with the valve seat 52 by an impulse imparted by the tip 34 of the actuated drive pin 36 to the wall 62 of the movable element 60. As a result, the drive pin 36 is actuated and an amount fluid material is jetted from the fluid chamber 38 without any portion of the drive pin 36, including but not limited to the tip 34, being wetted by the jetted fluid material. When contact between the drive pin 36 and wall 62 is removed, the axial spring force applied by the biasing element 68 acts to move the valve element 14 and movable element 60 away from the valve seat 52 in a direction aligned with the longitudinal axis of the drive pin 36. Each reciprocating cycle of the drive pin 36 and valve element 14 jets a droplet of the fluid material. The cycle is repeated to jet sequential droplets of fluid material as required.

The surface of the valve element 14 facing the valve seat 52 may have a curvature to match the shape of the surface of the valve seat 52 encircling opening 54. As a result of the shape matching, a fluid seal is temporarily formed when the valve element 14 has a contacting relationship with valve seat 52 during jetting. Establishment of the fluid seal during motion of the valve element 14 halts the flow of fluid material from the fluid chamber 38 past the valve seat 52.

In embodiments where a unified movable element 300, shown in FIG. 2C, is used, the drive pin 34 would contact the upper portion 302 of element 300 to cause the lower end 304 to contact the valve seat and jet a droplet of material. As indicated in FIG. 2C, in the same way as in the previously disclosed embodiment, the outer surface of element 300 would be sealed against O-ring 64 and the spring 68 would provide an upward biasing force on the element 300.

The Heater

A heater 76, which has a body 80 that operates as a heat transfer member, at least partially surrounds the fluid module 12. The heater 76 may include a conventional heating element (not shown), such as a cartridge-style resistance heating element residing in a bore defined in the body 80. The heater 76 may also be equipped with a conventional temperature sensor (not shown), such as a resistive thermal device (RTD), a thermistor, or a thermocouple, providing a feedback signal for use by a temperature controller in regulating the power supplied to the heater 76. The heater 76 includes pins 79 that contact respective soft, electrically conductive contacts 59 associated with the guide block 74b (later described) in order to provide signal paths for a temperature sensor and to provide current paths for transferring electrical power to the heating element and temperature sensor. As will be explained in more detail below, the fluid module 12 sits within the heater 76, and when the heater 76 is drawn against the actuator body 74 by retainer arms (later described) the fluid module is held in compression between the heater 76 and actuator body 74.

Piezoelectric Drive Module

Figure 1A:
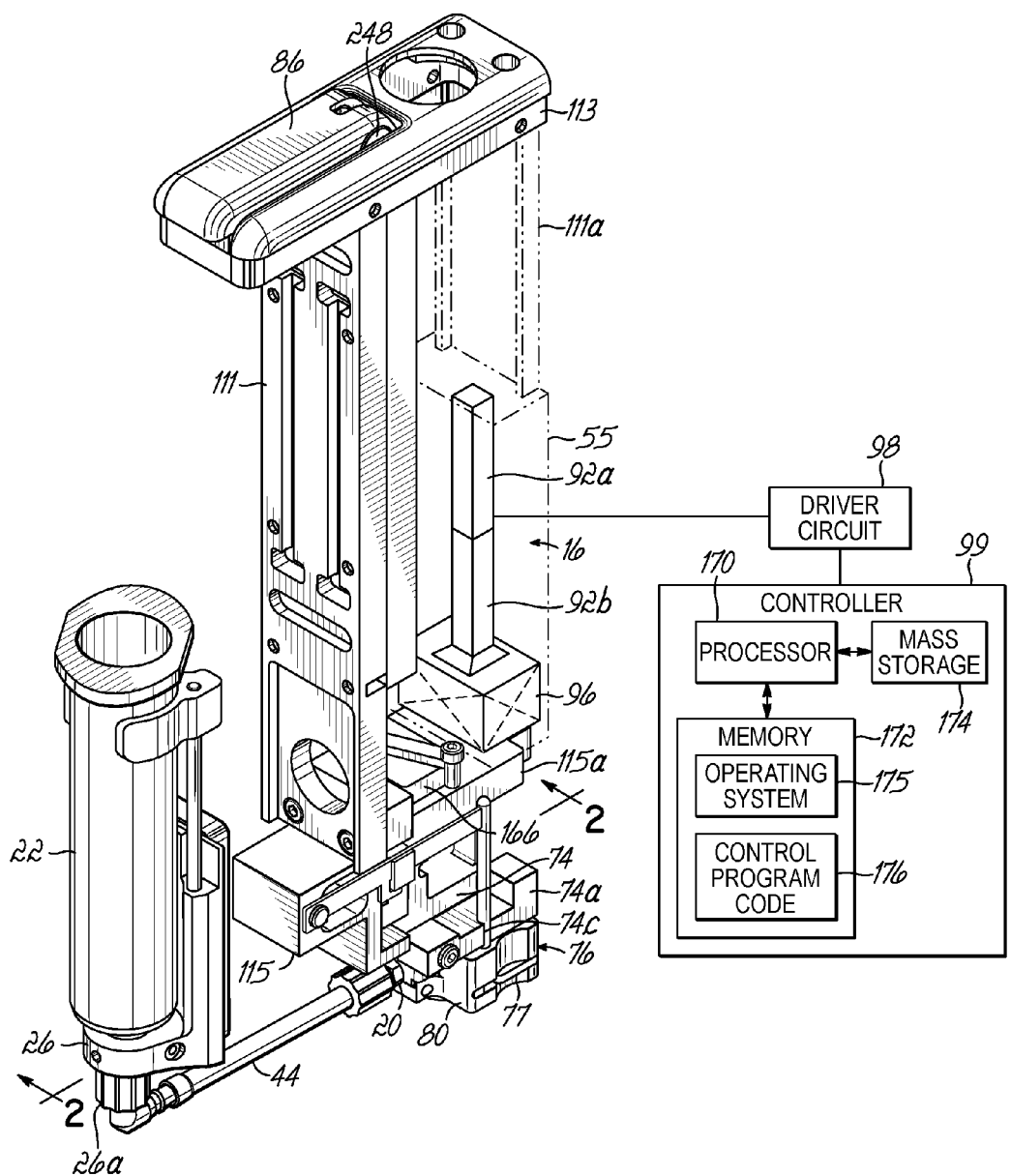
FIG. 1A is a perspective view similar to FIG. 1 in which an outer housing of the modular jetting device has been removed for purposes of description.
Figure 2:
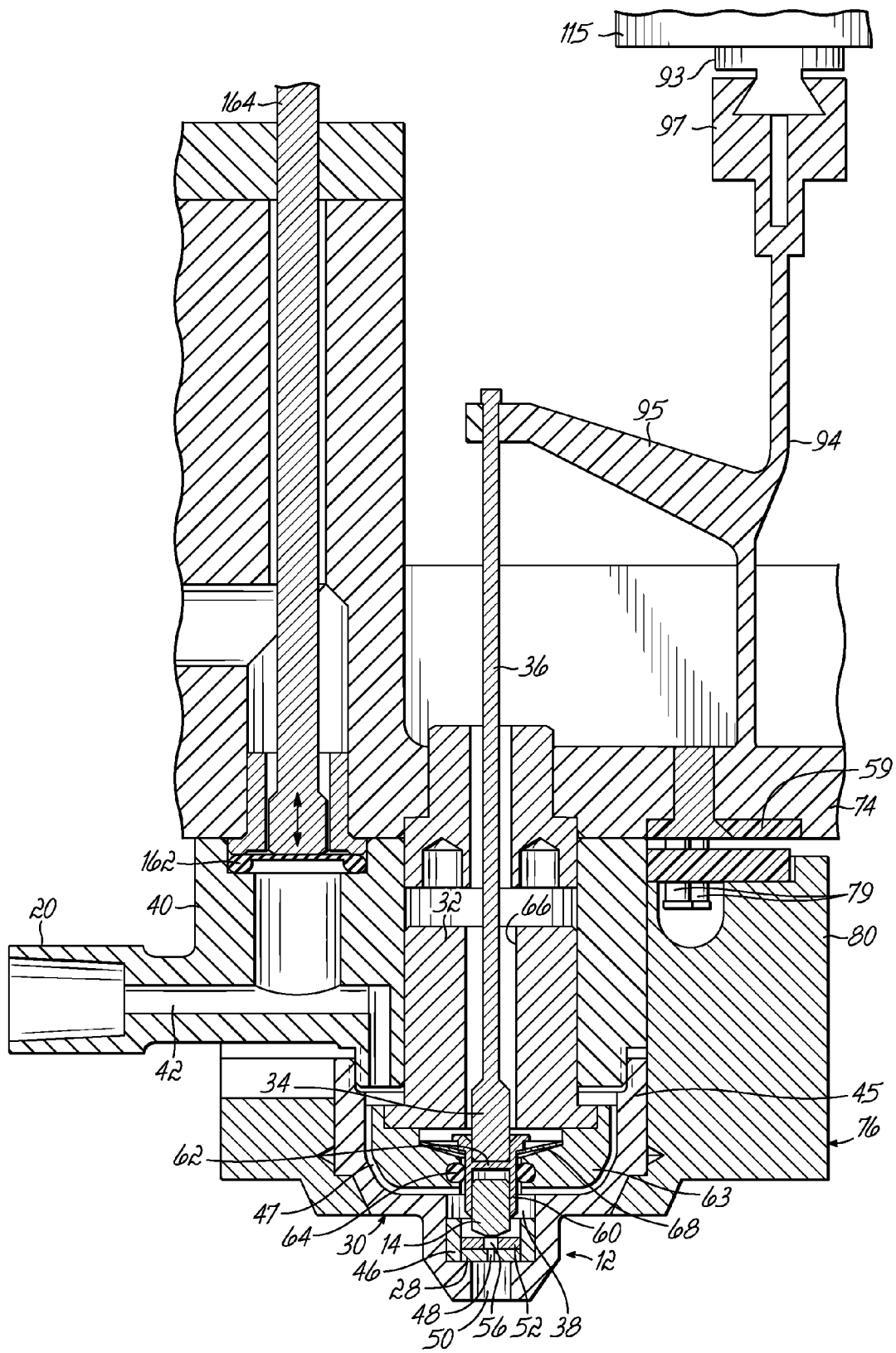
FIG. 2 is a cross-sectional view taken generally along line 2-2 in FIG. 1A.
Figure 2A:
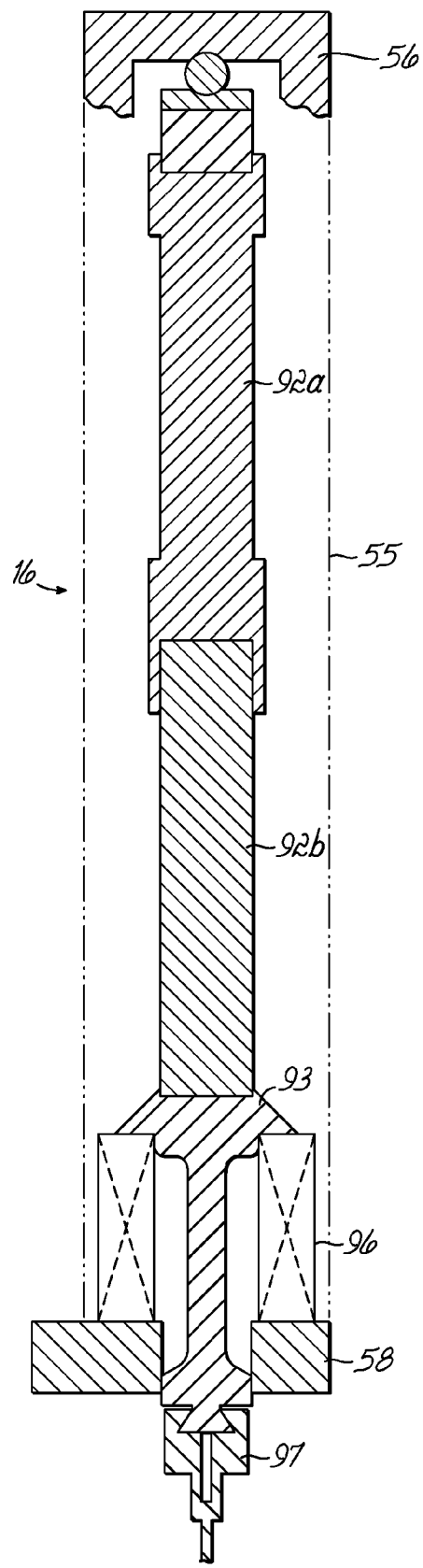
FIG. 2A is a view of a portion of the piezoelectric drive module.
Figure 2B:
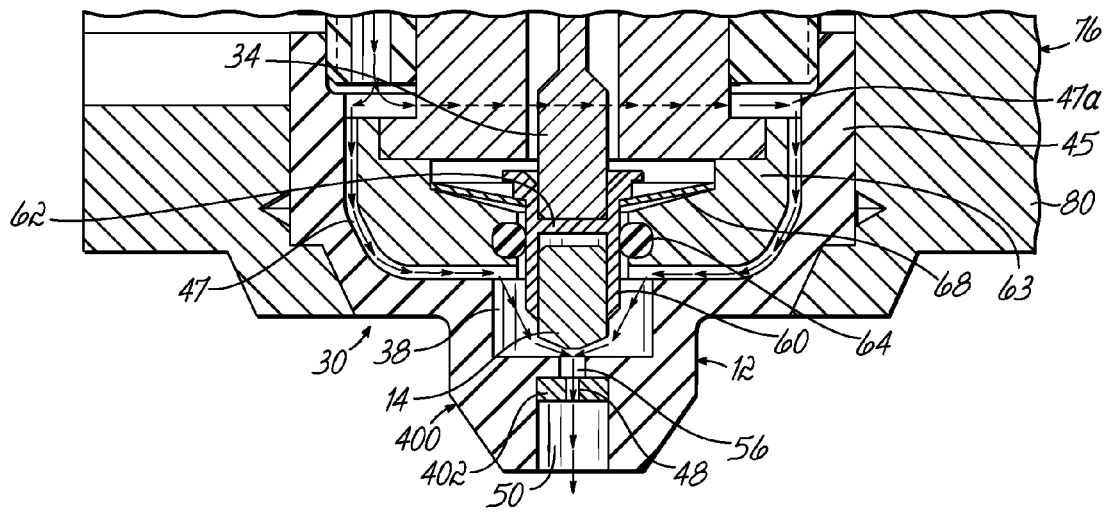
FIG. 2B shows an alternative embodiment of the modular jetting device.
Figure 2C:
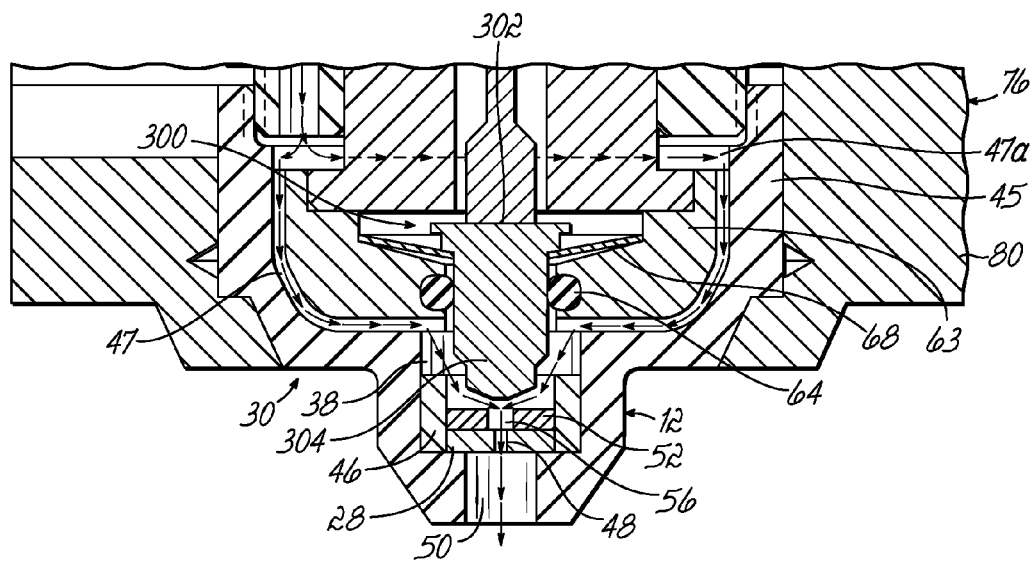
FIG. 2C shows an alternative embodiment of the modular jetting device.
Figure 4:
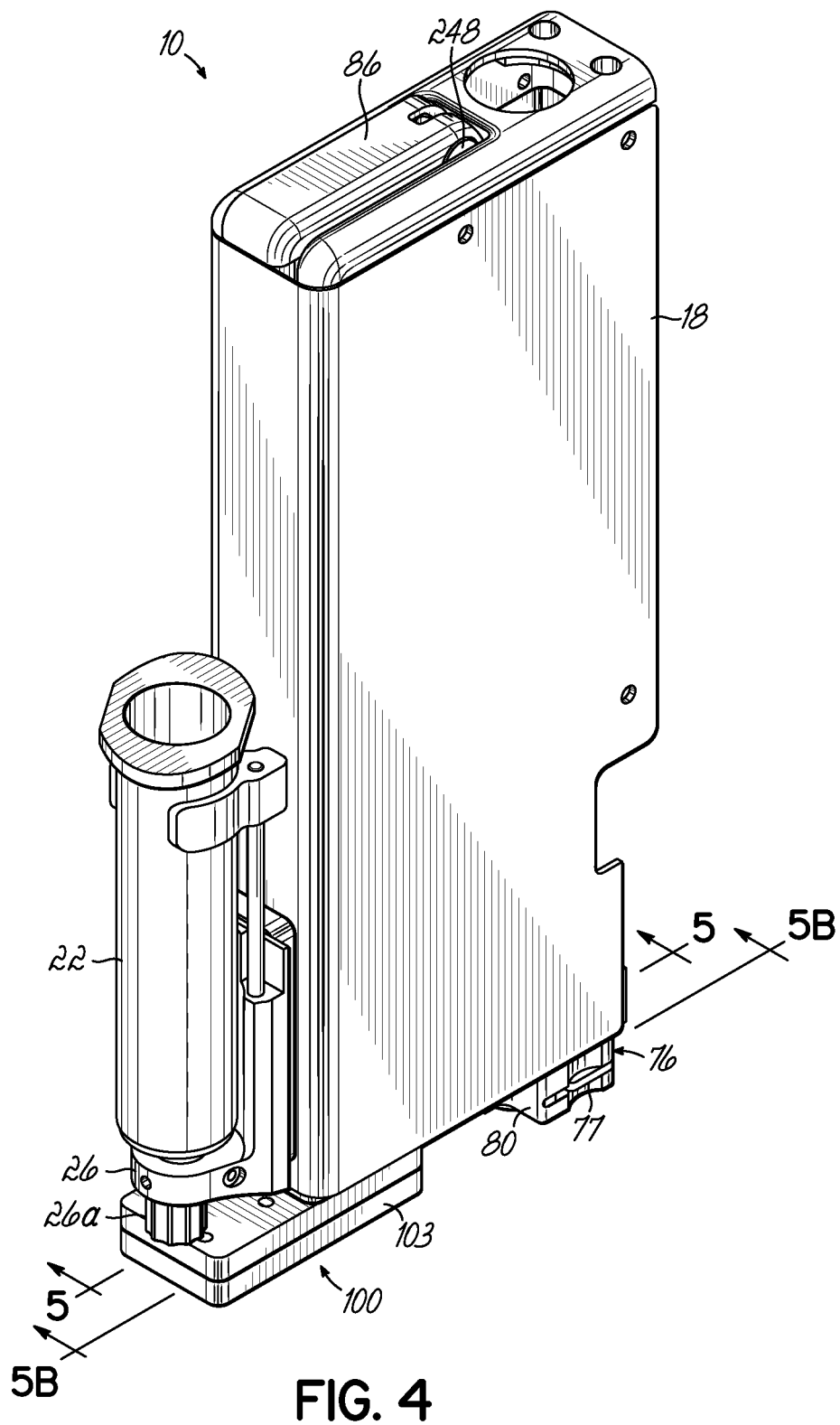
FIG. 4 is a perspective view of a modular jetting device in accordance with an alternative embodiment of the invention.
Figure 4A:
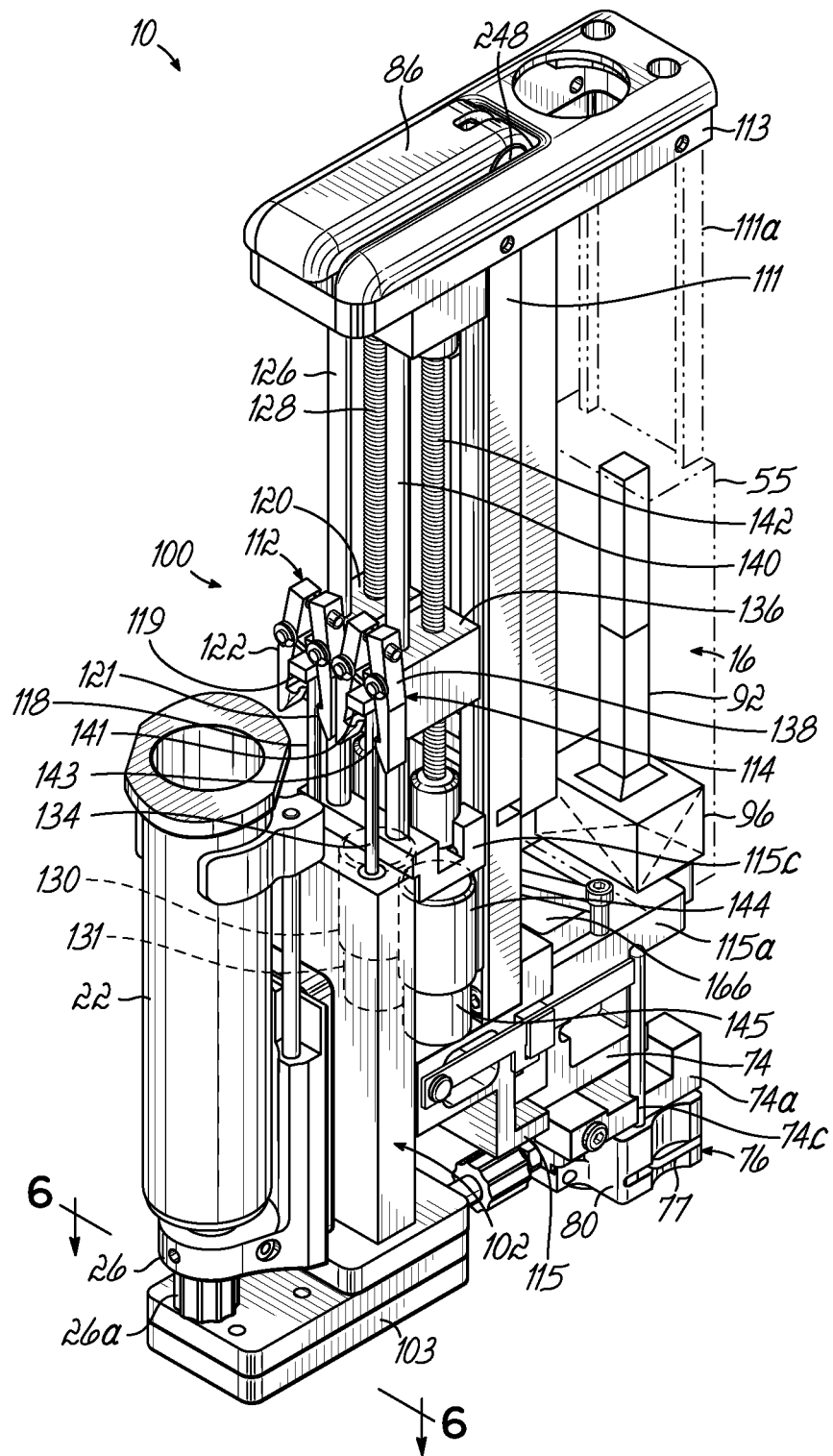
FIG. 4A is a perspective view similar to FIG. 4 in which an outer housing of the modular jetting device has been removed for purposes of description.

With reference to FIGS. 1A, 2, and 2A, in one embodiment, the piezoelectric drive module 16 is used to actuate the valve 14 of fluid module 12. Piezoelectric drivers for dispensing valves are known. For example, U.S. Pat. No. 5,720,417 shows a piezoelectric driver used to actuate the valve of a fluid dispenser and is incorporated by reference herein in its entirety for all purposes. In the present embodiment, the piezoelectric drive module 16 includes piezoelectric stacks 92a and 92b, a plunger 93, an asymmetrical flexure 94. Flexure 94 is an integral part of actuator body 74 and includes a coupling element 97 that connects the flexure 94 to the plunger 93. A spring 96 applies a spring force to the plunger 93 and piezoelectric stacks 92a, 92b to keep them in compression. As best shown in FIGS. 1A and 4A, the actuator body 74 is sandwiched between guide blocks 74a and 74b, which will be described later in more detail. The guide blocks 74a and 74b are attached to actuator body 74 by conventional fasteners. The piezoelectric stacks 92a, 92b, the plunger 93, and the spring 96 are confined as an assembly between mechanical constraints supplied by a C shaped bracket 55 having upper and lower extensions 56, 58. Bracket 55, shown in phantom in FIG. 1A, is supported between load cell pad 115a, which is attached to lower member 115, and a support member 111a that is attached to upper member 113.

The plunger 93 functions as a mechanical interface connecting the piezoelectric stack 92 with the asymmetrical flexure 94. The spring 96 is compressed in the assembly such that the spring force generated by the spring 96 applies a constant load on piezoelectric stack 92, which preloads the piezoelectric stack 92. The asymmetrical flexure 94, which may be comprised of a metal, has an arm 95 that is physically secured with an end of the drive pin 36 opposite to the tip 34 of drive pin 36. The asymmetrical flexure 94 functions as a mechanical amplifier that converts the relatively small displacement of the piezoelectric stack 92 into a useful displacement for the drive pin 36 that is significantly larger than the displacement of the piezoelectric stack 92.

The piezoelectric stack 92 of piezoelectric drive module 16 is a laminate comprised of layers of a piezoelectric ceramic that alternate with layers of a conductor as is conventional in the art. The spring force from spring 96 maintains the laminated layers of the piezoelectric stack 92 in a steady state of compression. The conductors in the piezoelectric stack 92 are electrically coupled with a driver circuit 98, which supplies current-limited output signals, in a manner well known in the art, with pulse width modulation, frequency modulation, or a combination thereof. When power is periodically supplied from the driver circuit 98, electric fields are established that change the dimensions of the piezoelectric ceramic layers in the piezoelectric stack 92.

The dimensional changes experienced by the piezoelectric stack 92, which are mechanically amplified by the asymmetrical flexure 94, move the drive pin 36 linearly in a direction parallel to its longitudinal axis. When the piezoelectric ceramic layers of the piezoelectric stack 92 expand, the spring 96 is compressed by the force of the expansion and the asymmetrical flexure 94 pivots about a fixed pivot axis to cause movement of the tip 34 of drive pin 36 upward in FIG. 2 away from the wall 62 of movable element 60. This allows biasing element 68 to move the valve element 14 away from valve seat 52. When the actuation force is removed and the piezoelectric ceramic layers of the piezoelectric stack 92 are permitted to contract, the spring 96 expands and the asymmetrical flexure 94 pivots to move the drive pin 36 downward in FIG. 2 so that the tip 34 moves into contact with the wall 62, causing the valve element 14 to contact valve seat 52 and jet a droplet of material. Thus, in the de-energized state, the piezo stack assembly maintains the valve in a normally closed position. In normal operation, the asymmetrical flexure 94 intermittently rocks in opposite directions about a fixed pivot axis as the stack 92a, 92b is energized and de-energized to move the tip 34 of drive pin 36 into and out of contact with the wall 62 of the movable element 60 to jet droplets of material at a rapid rate.

The driver circuit 98 for piezoelectric drive module 16 is controlled by a controller 99. The controller 99 may comprise any electrical control apparatus configured to control one or more variables based upon one or more inputs. The controller 99 can be implemented using at least one processor 170 selected from microprocessors, micro-controllers, microcomputers, digital signal processors, central processing units, field programmable gate arrays, programmable logic devices, state machines, logic circuits, analog circuits, digital circuits, and/or any other devices that manipulate signals (analog and/or digital) based on operational instructions that are stored in a memory 172. The memory 172 may be a single memory device or a plurality of memory devices including but not limited to random access memory (RAM), volatile memory, non-volatile memory, static random access memory (SRAM), dynamic random access memory (DRAM), flash memory, cache memory, and/or any other device capable of storing digital information. The controller 99 has a mass storage device 174 that may include one or more hard disk drives, floppy or other removable disk drives, direct access storage devices (DASD), optical drives (e.g., a CD drive, a DVD drive, etc.), and/or tape drives, among others.

The processor 170 of the controller 99 operates under the control of an operating system 175, and executes or otherwise relies upon computer program code embodied in various computer software applications, components, programs, objects, modules, data structures, etc. The program code 176 residing in memory 172 and stored in the mass storage device 174 also includes control algorithms that, when executing on the processor 170, control the operation of the piezoelectric drive module 16 and, in particular, provide control signals to the driver circuit 98 for driving the piezoelectric drive module 16. The computer program code typically comprises one or more instructions that are resident at various times in memory 172, and that, when read and executed by the processor 170, causes the controller 99 to perform the steps necessary to execute steps or elements embodying the various embodiments and aspects of the invention.

Various program code described herein may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

The controller 99 may include a human machine interface (HMI) that is operatively connected to the processor 170 in a conventional manner. The HMI (not shown) may include output devices, such as alphanumeric displays, a touch screen, and other visual indicators, and input devices and controls, such as an alphanumeric keyboard, a pointing device, keypads, pushbuttons, control knobs, etc., capable of accepting commands or input from an operator and communicating the entered input to the processor 170, and of displaying information to the operator.

The controller 99 may optionally be used to control the operation of devices supporting the operation of a manufacturing tool that embodies the modular jetting device 10 of the embodiments of the invention. For example, the controller 99 is coupled with a load cell 166 that generates pressure measurement readings through its connection with diaphragm 162 by means of rod 164, as described below. These pressure measurement readings are communicated to the controller 99 as feedback for use in controlling the operation of the modular jetting device 10 when the positive displacement pump 102 is deployed.

Positive Displacement Pump

With reference to FIGS. 4, 4A, 5, 5A-C, and 6 in which like reference numerals refer to like features in FIGS. 1-3 and in accordance with an alternative embodiment of the invention, the modular jetting device 10 may include a supply module 100 connectable to the fluid connection interface 20 at a location between the syringe 22 and the fluid connection interface 20. The supply module 100 includes a positive displacement pump 102, a manifold block 103, and a plurality of check valves 104, 106, 108, 110 in the fluid paths inside the manifold block 103. The positive displacement pump 102, which is illustrated as a reciprocating-type positive displacement pump, can be mounted to the lower member 115 by conventional fasteners.

The positive displacement pump 102 is configured to pump the fluid material to the inlet to the fluid chamber 38 of the fluid module 12. To that end, the positive displacement pump 102 includes a first piston pump 112 and a second piston pump 114 configured to be controlled in a coordinated manner to supply the fluid material in a timed sequence to the fluid connection interface 20 of the fluid module 12. The controller 99 executes program code that provides the sequence timing and coordinates the operation of the first and second piston pumps 112, 114.

The first piston pump 112 has a piston cylinder 116, a piston 118 disposed inside the piston cylinder 116, and a carriage 120. One end of the piston 118 includes a head 119 and a set of grippers or jaws 122. Jaws 122 are pivotally attached to the carriage 120 and grip the head 119 in a releasable clamping action. Each of the jaws 122 has a respective hook 121 that, when the jaws 122 are closed to clamp the head 119, engages a side edge of the head 119. The jaws 122, which are spring biased to a closed position by, for example, torsion springs, may be opened by the application of a manual force that overcomes the spring bias and separates the jaws 122. When the manual force is removed, the jaws 122 close to clamp the head 119 of the piston 118. Alternatively, a fixed stop (not shown) may be mounted to support element 115c. Support element 115c contacts the top of pump 102 and is rigidly attached to support wall 111. The fixed stop may open the jaws 122 to disengage the piston head 119 as the jaws 122 are moved into contact with it.

The carriage 120 associated with piston 118 rides on a linear bearing 126 as a linear motion constraint and is moved linearly relative to the linear bearing 126 by a lead screw 128. Linear bearing 126 is attached at its bottom end to support element 115c and at its upper end to upper member 113. The rotary motion of lead screw 128 is driven by a motor 130 and is converted by the motion of the carriage 120 into linear motion of the piston 118 inside piston cylinder 116. The motor 130 can be bi-directionally driven by instructions from the controller 99 so that the lead screw 128 is rotated in both rotational senses and the piston 118 can be moved in opposite linear directions relative to the piston cylinder 116 by the rotation of the lead screw 128.

A detector in the representative form of a rotary encoder 131 tracks the motion of the motor 130 and thereby permits the controller 99 to track the location of the carriage 120 along the length of the lead screw 128. The number of motor encoder counts detected by the rotary encoder 131 and supplied (e.g., as optical or electrical signals) from the rotary encoder 131 to the controller 99 effectively tracks the displacement of the piston 118 and can be correlated with the amount of fluid material being displaced. The controller 99 may use the signals from the rotary encoder 131 for closed-loop feedback control of the operation of the positive displacement pump 102 and, in particular, control of the operation of the first piston pump 112.

The second piston pump 114, which may be constructed identically to the first piston pump 112, includes a piston cylinder 132, a piston 134, and a carriage 136. One end of the piston 134 includes a head 141 and a set of grippers or jaws 138, which are pivotally attached to the carriage 136, grips the head 119 in a releasable clamping action. Each of the jaws 138 has a respective hook 143 that, when the jaws 138 are closed to clamp the head 141, engages a side edge of the head 141. The jaws 138, which are spring biased to a closed position by, for example, torsion springs, may be opened by the application of a manual force that overcomes the spring bias and separates the jaws 138. When the manual force is removed, the jaws 138 close to clamp the head 141 on the piston 134. Again, a fixed stop may alternately be used to open the jaw 138 upon contact.

The carriage 136 associated with piston 134 rides on a linear bearing 140 as a linear motion constraint and is moved linearly relative to the linear bearing 140 by a lead screw 142. Linear bearing 140 is attached at its lower end to support element 115c and at its upper end to upper member 113. The rotary motion of lead screw 142 is driven by a motor 144 and is converted by the motion of the carriage 136 into linear motion of the piston 134 inside piston cylinder 132. The motor 144 can be bi-directionally driven by instructions from the controller 99 so that the lead screw 142 is rotated in both rotational senses and the piston 134 can be moved in opposite linear directions relative to the piston cylinder 132 by the rotation of the lead screw 142.

A rotary encoder 145 tracks the motion of the motor 144 of the second piston pump 114 and thereby permits the controller 99 to track the location of the carriage 136 along the length of the lead screw 142. The number of motor encoder counts detected by the rotary encoder 145 and supplied (e.g., as optical or electrical signals) to the controller 99 effectively tracks the displacement of the piston 134 and can be correlated with the amount of fluid material being displaced. The controller 99 may use the signals from the rotary encoder 145 for closed-loop feedback control over the operation of the positive displacement pump 102 and, in particular, control over the operation of the second piston pump 114.

The Manifold Block

The piston pumps 112, 114 operate in conjunction with the manifold block 103, which may be composed of aluminum. Pumps 112, 114 are attached to manifold block 103 by conventional fasteners (not shown). As best shown in FIGS. 5, 5A-C, and 6, disposed inside the manifold block 103 are a feed passageway 150, a discharge passageway 152, a first branch passageway 154, and a second branch passageway 156. The discharge passageway 152 is coupled in fluid communication with the fluid connection interface 20. The first branch passageway 154 couples the feed passageway 150 in fluid communication with the discharge passageway 152. The second branch passageway 156 couples the feed passageway 150 in fluid communication with the discharge passageway 152. Passageways 150, 152, 154 constitute a first fluid path coupled with the first piston pump 112. Passageways 150, 152, 156 constitute a second fluid path coupled with the second piston pump 114.

The interior volume of the piston cylinder 116 of the first piston pump 112 fluidly communicates with the first branch passageway 154. Check valves 104, 106 (FIGS. 5, 5A) are positioned on opposite sides of the centrally-located fluid connection between the piston cylinder 116 and the first branch passageway 154.

Figure 5:
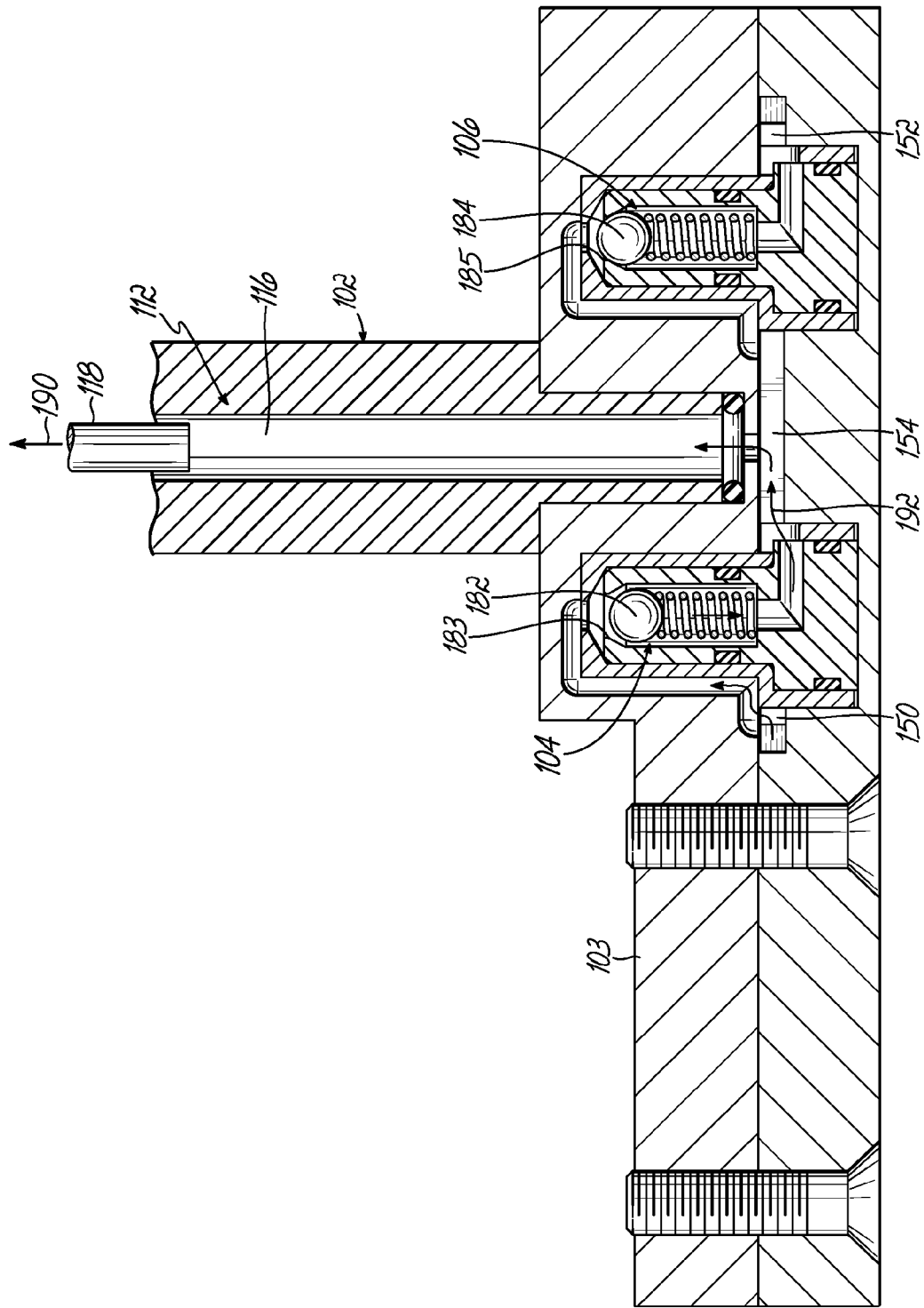
FIG. 5 is a cross-sectional view taken generally along line 5-5 in FIG. 4 and showing a first piston pump of the positive displacement pump during an intake cycle.
Figure 5A:
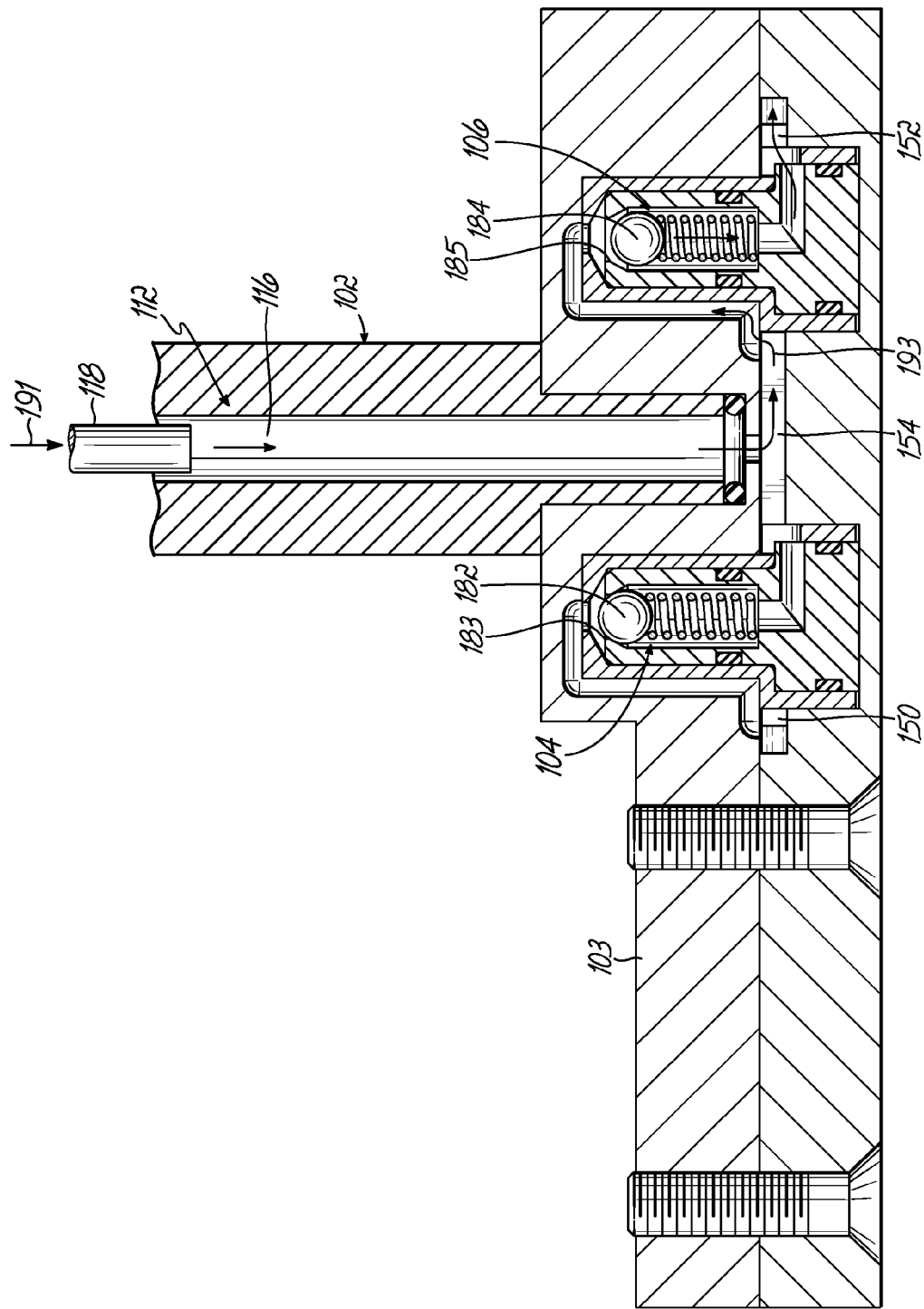
FIG. 5A is a cross-sectional view similar to FIG. 5 in which the check valves associated with the first piston pump of the positive displacement pump are repositioned during a discharge cycle.
Figure 6:
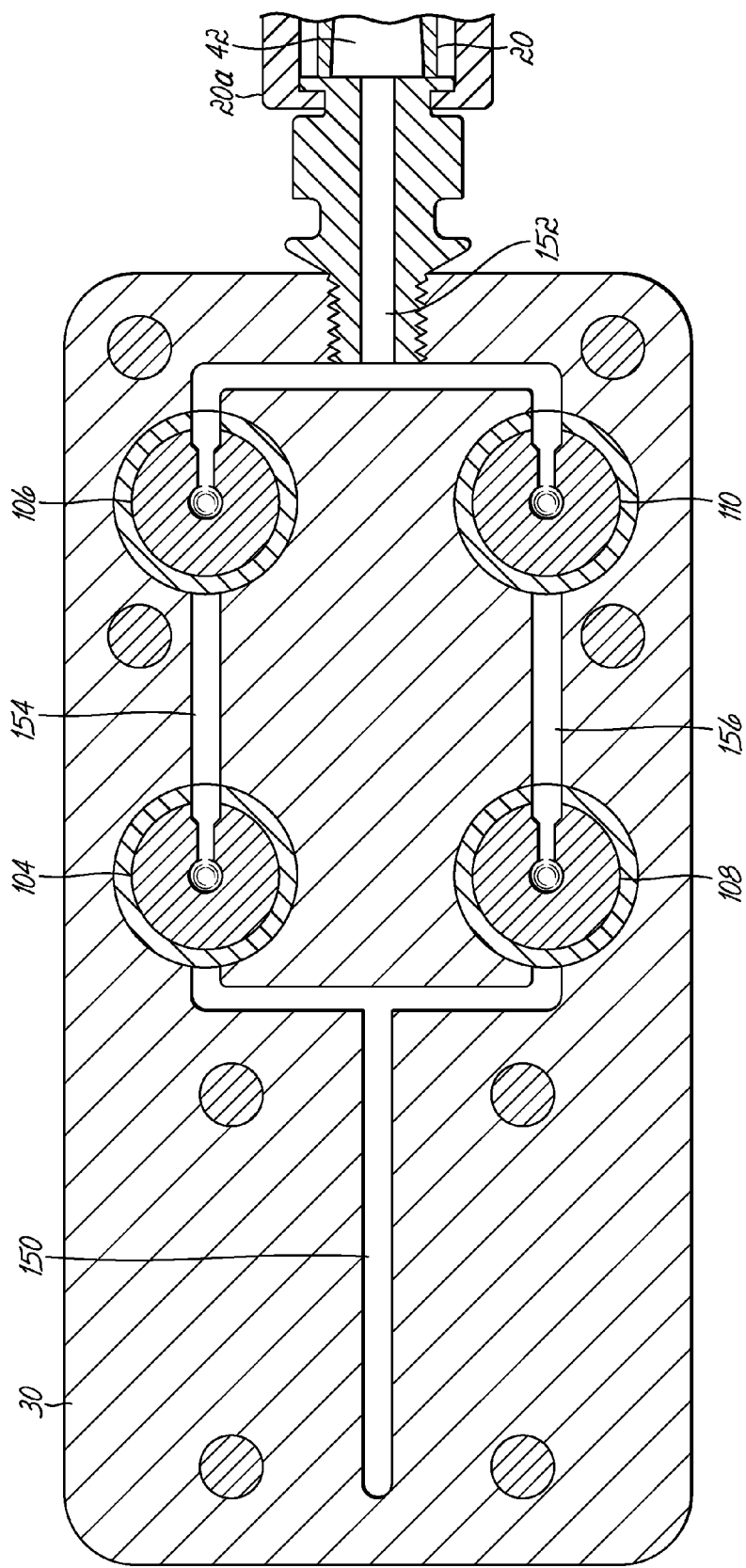
FIG. 6 is a cross-sectional view taken generally along line 6-6 in FIG. 4A.

As best shown in FIGS. 5, 5A, and 6, check valve 104 is disposed in the fluid path between the syringe 22 and the fluid connection with the piston cylinder 116 of the first piston pump 112. The check valve 104 is specifically positioned at the transition from the one of the outlets of the feed passageway 150 to an inlet of the first branch passageway 154. The check valve 104 includes a spring-loaded movable body 182 that can be displaced from a seat 183 by forward flow so that fluid material can be transferred from the syringe 22 to the first piston pump 112 and fill the piston cylinder 116 with fluid material during an intake cycle of first piston pump 112 as shown in FIG. 5. During a discharge cycle of first piston pump 112 as shown in FIG. 5A, the orientation of the check valve 104 prohibits reverse flow of fluid material from the first piston pump 112 to the syringe 22. Specifically, the spring-loaded movable body 182 of the check valve 104 will be seated against seat 183 by the fluid pressure in first branch passageway 154, which is generated by the motion of the piston 118 inside the piston cylinder 116 during the discharge cycle.

Check valve 106 is disposed in the fluid path between the fluid inlet 42 to the fluid chamber 38 and the fluid connection with the piston cylinder 116 of the first piston pump 112, and is also therefore disposed in the fluid path between the fluid connection interface 20 and the first piston pump 112. The check valve 106 is specifically positioned at the transition from one of the inlets to the discharge passageway 152 and an outlet from the first branch passageway 154. The check valve 106 includes a spring-loaded movable body 184 that can be displaced from a seat 185 by forward flow so that fluid material can be pumped by the first piston pump 112 to the fluid chamber 38 during a discharge cycle as shown in FIG. 5A. During an intake cycle of first piston pump 112 as shown in FIG. 5, the orientation of the check valve 106 prohibits reverse flow of fluid material from the fluid chamber 38 to the first piston pump 112. Specifically, the spring-loaded movable body 184 of the check valve 106 will be seated against seat 185 by the fluid pressure in first branch passageway 154, which is generated by the motion of the piston 118 inside the piston cylinder 116 during the intake cycle.

The piston 118 is moved within the piston cylinder 116 by the motion of carriage 120, which is powered by motor 130, in a direction 190 to intake fluid material from the feed passageway 150, as depicted in FIG. 5. In response to the motion of piston 118, the check valve 104 opens and fluid material flows, as diagrammatically shown by reference numeral 192, past the opened check valve 104 through the first branch passageway 154 from the feed passageway 150 into the interior of the piston cylinder 116. The fluid material fills the space in the piston cylinder 116 vacated by the piston 118. The potential source of the reverse flow of fluid material from fluid chamber 38, which is prevented by check valve 106, occurs when the piston cylinder 116 is being filled by fluid material and suction is applied on the outlet side of the first piston pump 112.

When the piston cylinder 116 contains an appropriate amount of fluid material and at the end of the stroke, the motor 130 reverses the motion of the carriage 120. The reverse motion of the carriage 120 causes the piston 118 to move in a direction 191, as depicted in FIG. 5A. Motion of the piston 118 relative to the piston cylinder 116 expels the fluid material in the piston cylinder 116, as diagrammatically shown by reference numeral 193, under pressure toward the fluid connection interface 20. Check valve 106 opens to permit the fluid material to flow through first branch passageway 154 to discharge passageway 152. Check valve 104 closes to prohibit reverse fluid flow from the piston cylinder 116 to the syringe 22.

The interior volume of the piston cylinder 132 of the second piston pump 114 communicates with the second branch passageway 156 at a location between the outlet from the feed passageway 150 and the inlet to the discharge passageway 152. Check valves 108, 110 (FIGS. 5B, 5C) are located in the second branch passageway 156.

Figure 5B:
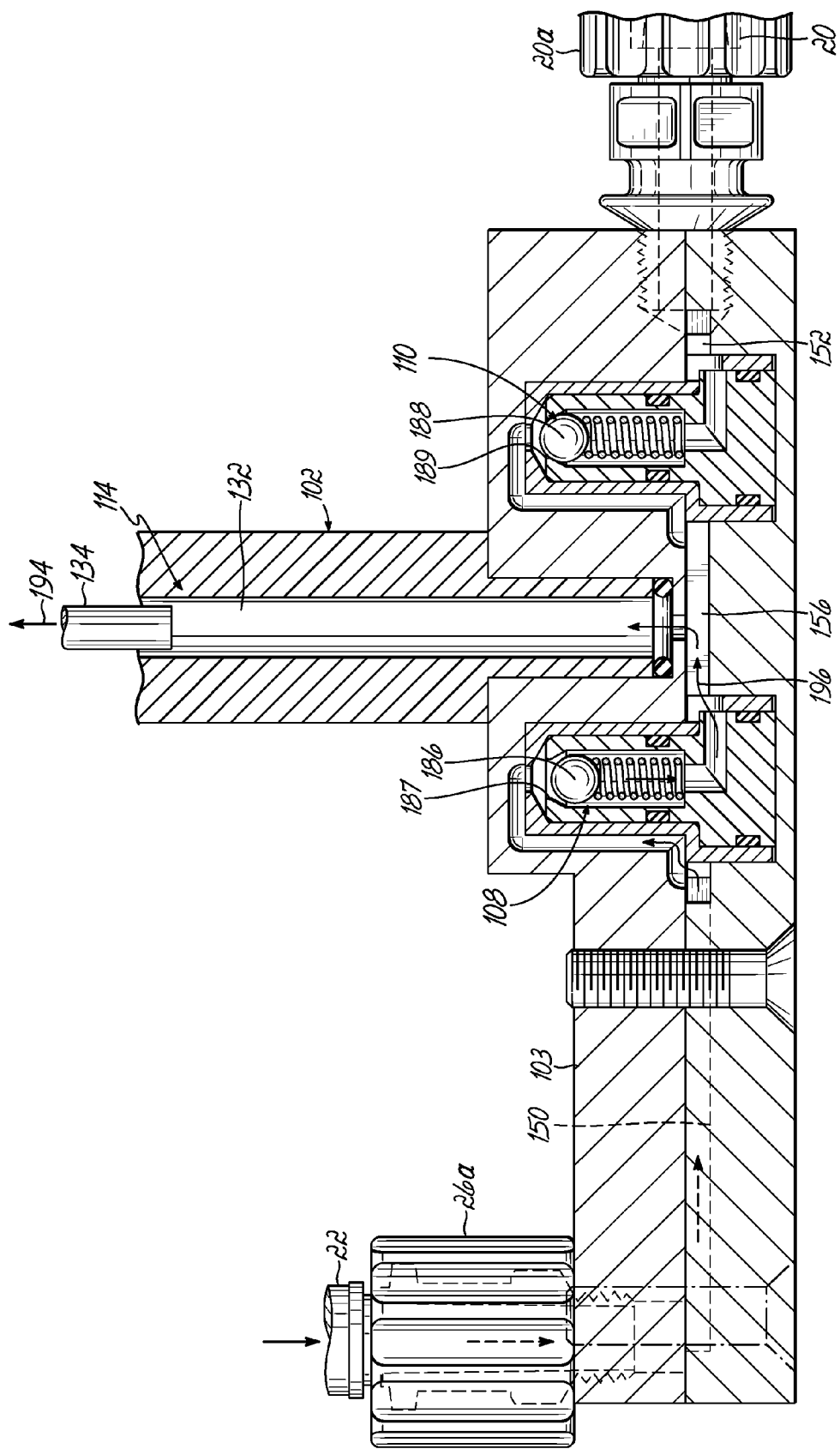
FIG. 5B is a cross-sectional view taken generally along line 5B-5B in FIG. 4 and showing a second piston pump of the positive displacement pump during an intake cycle.

As best shown in FIGS. 5B, 5C, 6, check valve 108 is disposed in the fluid path between the syringe 22 and the fluid connection with the piston cylinder 132 of the second piston pump 114. The check valve 108 is specifically positioned at the transition from the one of the outlets of the feed passageway 150 to an inlet of the second branch passageway 156. The check valve 108 includes a spring-loaded movable body 186 that can be displaced from a seat 187 by forward flow so that fluid material can be transferred from the syringe 22 to the second piston pump 114 and fill the piston cylinder 132 with fluid material during an intake cycle of second piston pump 114 as shown in FIG. 5B. During a discharge cycle of second piston pump 114 as shown in FIG. 5C, the orientation of the check valve 108 prohibits reverse flow of fluid material from the second piston pump 114 to the syringe 22. Specifically, the spring-loaded movable body 186 of the check valve 108 will be seated against seat 187 by the fluid pressure in the second branch passageway 156, which is generated by the motion of the piston 134 inside the piston cylinder 132 during the discharge cycle.

Check valve 110 is disposed in the fluid path between the fluid inlet 42 to the fluid chamber 38 and the fluid connection with the piston cylinder 132 of the second piston pump 114, and is also therefore disposed in the fluid path between the fluid connection interface 20 and the second piston pump 114. The check valve 110 is specifically positioned at the transition from one of the inlets to the discharge passageway 152 and an outlet from the second branch passageway 156, and is also therefore disposed in the fluid path between the fluid connection interface 20 and the second piston pump 114. The check valve 110 includes a spring-loaded movable body 188 that can be displaced from a seat 189 by forward flow so that fluid material can be pumped by the second piston pump 114 to the fluid chamber 38 during a discharge cycle as shown in FIG. 5C. During an intake cycle of second piston pump 114 as shown in FIG. 5B, the orientation of the check valve 110 prohibits reverse flow of fluid material from the fluid chamber 38 to the second piston pump 114. Specifically, the spring-loaded movable body 188 of the check valve 110 will be seated against seat 189 by the fluid pressure in the second branch passageway 156, which is generated by the motion of the piston 134 inside the piston cylinder 132 during the intake cycle.

The piston 134 is moved within the piston cylinder 132 by the motion of carriage 136, which is powered by the motor 144, in a direction 194 in a direction to intake fluid material from the feed passageway 150, as depicted in FIG. 5B. In response to the motion of piston 134, the check valve 108 opens and fluid material flows, as diagrammatically indicated by reference numeral 196, past the opened check valve 108 through the second branch passageway 156 from the feed passageway 150 into the interior of the piston cylinder 132. The fluid material fills the space in the piston cylinder 132 vacated by the piston 134. The potential source of the reverse flow of fluid material from fluid chamber 38, which is prevented by check valve 110, occurs when the piston cylinder 132 is being filled with fluid material and suction is applied on the outlet side of the second piston pump 114.

When the piston cylinder 132 contains an appropriate amount of fluid material and at the end of the stroke, the motor 144 reverses the motion of the carriage 136. The reverse motion of the carriage 136 causes the piston 134 to move in a direction 195, as depicted in FIG. 5C. Motion of the piston 134 relative to the piston cylinder 132 expels the fluid material in the piston cylinder 132, as diagrammatically indicated by reference numeral 197, under pressure toward the fluid connection interface 20. Check valve 110 opens to permit the fluid material to flow through second branch passageway 156 to discharge passageway 152. Check valve 108 closes to prohibit reverse fluid flow of fluid material from the piston cylinder 132 to the syringe 22.

Control of Pump Wink

The alternation between the first piston pump 112 of positive displacement pump 102 and the second piston pump 114 of positive displacement pump 102 switches the source of fluid material supplied to the discharge passageway 152 and fluid inlet 42. In other words, the piston pumps 112, 114 alternate in operation between intake and discharge cycles. Unless precautions are taken, a "wink", or reduction, of fluid pressure and fluid flow can occur at the changeover between intake and discharge cycles when the positive displacement pump 102 switches from piston pump 112 to piston pump 114 and when the positive displacement pump 102 switches from piston pump 114 to piston pump 112. The intake and discharge cycles are both servo operations conducted by the controller 99 and are effectively independent of each other. The controller 99 is only used to coordinate the operation of the pistons pumps 112, 114 during the transition between intake and discharge cycles. The pressure sensor, which is comprised of diaphragm 162, rod 164, and load cell 166, assesses the fluid pressure at a location in the flow path that is downstream from the positive displacement pump 102 and upstream of the fluid chamber 38.

A condition that indicates a wink is about to occur is when one of the piston pumps 112, 114 is loaded with fluid material at a cylinder-is-full point near the end of an intake cycle and the other of the piston pumps 112, 114 is nearly emptied of fluid material at a time-to-refill point near the end of a discharge cycle. The time-to-refill point is represented by an encoder count-based address from rotary encoder 131 that represents that the piston 118 has discharged a targeted amount of fluid material from the piston cylinder 116 or alternatively from rotary encoder 145 that represents that the piston 134 has discharged a targeted amount of fluid material from the piston cylinder 132. Conversely, the cylinder-is-full point is a position for the piston 118, as reflected by an encoder count-based address from rotary encoder 131, that indicates the maximum amount of fluid material is contained in the piston cylinder 116 or a position for the piston 134, as reflected by an encoder count-based address from rotary encoder 145, that indicates the maximum amount of fluid material is contained in the piston cylinder 132. Each of the piston pumps 112, 114 includes high and low optical limit switches that may optionally be used to indicate the time-to-refill or cylinder-is-full indications.

Once the controller 99 discerns the approach of a transition between the piston pumps 112, 114 and while monitoring the output of the pressure sensor, the controller 99 will cause the full one of the piston pumps 112, 114 to begin driving fluid out of its cylinder to the fluid module 12, and simultaneously will reverse the other of the piston pumps 112, 114 so that it stops driving fluid out of its cylinder to the fluid module 12 and starts refilling its cylinder instead. The pressure sensor may perceive and measure an increase in fluid pressure or a decrease in fluid pressure during the transition, which the controller 99 will sense from the signals communicated by the pressure sensor. In response to the fluid pressure increase or decrease during the transition, the controller 99 may provide speed corrections to the motors 130, 144 in order to maintain constant pressure and constant flow. A program code executing on the controller 99 may calculate the needed speed corrections and adjust the operation of the motors 130, 144 to provide the speed corrections.

The Pressure Sensor

Having described the function of the pressure sensor, details of its construction will now be described. With reference to FIGS. 1A, 2, 5, and 6, the fluid inlet 42 and passageway 47 connecting the fluid connection interface 20 with the fluid chamber 38 include a number of interconnected segments of various lengths and orientations. Shortly after the fluid material passes through the fluid connection interface 20, the fluid material flowing in fluid inlet 42 interacts with a diaphragm 162. The diaphragm 162 includes a peripheral ring that is securely anchored and a thin, semi-rigid membrane surrounded about its perimeter by the peripheral ring. The front side of the membrane of the diaphragm 162 is wetted by the flowing fluid material in the fluid inlet 42 and the back side of the membrane of the diaphragm 162 is not wetted. The differential fluid pressure across the opposite sides of the membrane of diaphragm 162 causes the membrane to deflect in proportion to the amount of fluid pressure applied by the fluid material to the diaphragm 162. Increasing fluid pressures in fluid inlet 42 cause greater amounts of deflection.

A rod 164 extends from the backside of the membrane of diaphragm 162 to contact load cell 166. The deformation of the membrane of the diaphragm 162 varies in proportion to the fluid pressure. As the fluid pressure changes, the diaphragm 162 communicates a force to the load cell 166 via the intervening rod 164 that is proportional to the fluid pressure. The load cell 166 communicates the pressure measurement readings to the controller 99 for the modular jetting device 10. In this manner, the diaphragm 162 and load cell 166 cooperate to operate as a pressure sensor that measures and assesses fluid pressure in the fluid inlet 42 for use in controlling the operation of the modular jetting device 10.

Removal of Supply Module

The jaws 122, 138 permit the supply module 100, comprised of pump 102 and manifold block 103, to be easily disconnected from the fluid connection interface 20 between the syringe 22 and the fluid connection interface 20 and from the jetting device 10 for cleaning or maintenance. To remove supply module 100, the carriages 120, 136 are driven down to their lowest point on FIG. 4A to push out any fluid in the cylinders 116, 132. At their lowest point, the jaws can be automatically opened by fixed stops as described above, or manually opened, to disengage the piston heads 119, 141. Next, the internally threaded fluid couplings 26a, 20a (see FIG. 5B) are disengaged from the syringe 22 and fluid connection interface 20, respectively. Finally, the conventional fasteners (not shown), such as bolts, that connect pump 102 to lower member 115 are removed so that the supply module 100, comprised of pump 102 and manifold block 103, can be removed as a unit for replacement with a like supply module 100, or for maintenance and cleaning of its wetted surfaces. Thus, not only is the fluid module 12 easy to disconnect from the jetting device 10 for maintenance, cleaning and replacement, but in addition the supply module 100 is also easy to disconnect from the jetting device 10 for maintenance, cleaning and replacement. Since the fluid module and the supply module include all the wetted surfaces of the jetting device 10, it is highly advantageous to be able to quickly remove and replace both of these components.

In addition, when the supply module 100 is disconnected, the syringe 22 can be directly connected in fluid communication with the fluid connection interface 20 using the fluid conduit 44 so that either of two fluid supply modules can be used to provide liquid material to the fluid module 12. Thus, the syringe 22 may be directly connected with the fluid connection interface 20 to define one fluid supply module (FIGS. 1-3) of the modular jetting device 10. Likewise, the supply module 100 (FIGS. 4-7) of the modular jetting device 10, which includes the syringe 22, may be connected with the fluid connection interface 20 to define another fluid supply module.

Coordination of the Piston Pump with the Drive Modules

The operation of the piston pumps 112, 114 may be coordinated to move the pistons 118, 134 within the respective piston cylinders 116, 132 such that the stream of fluid material supplied through the fluid connection interface 20 to the fluid module 12 can be substantially continuous and uninterrupted and at a flow rate that is substantially the same as the rate at which a liquid material is being jetted from the fluid module 12. The controller 99 may receive a pumping flow rate signal from the encoders 131, 145 indicating the flow rate at which the positive displacement pump 102 is pumping material into the fluid inlet 42 and ultimately into the fluid chamber 38.

In use, the controller 99 sends a start time signal to the positive displacement pump 102 indicating a start time for the positive displacement pump 102 to pump fluid material to the fluid inlet 42 of the fluid chamber 38 and a desired pumping flow rate signal representative of the rate at which material is to be jetted from fluid module 12. Using the encoders, the actual pumping rate can be compared to the desired pumping rate to make flow rate corrections. When the controller 99 sends a start time signal to the positive displacement pump 102, the controller 99 concurrently transmits a start time signal to the piezoelectric piezoelectric drive module 16, or pneumatic drive module 202 shown in the FIG. 14 embodiment (later described), to move the valve element 14 to the open position at a predetermined first delay period after the start time signal to start the positive displacement pump 102. Controller 99 then repeatedly moves the valve element 14 between the opened and closed positions during the jetting operation at a predetermined cycle rate that is correlated with the flow rate. The controller 99 also utilizes data indicating the volume of material to be jetted through the fluid module 12 during the current jetting operation and once that amount of material has been jetted, as determined from the encoders 131, 145, controller 99 sends an end time signal to the positive displacement pump 102 to stop pumping fluid material to the fluid inlet 42 of the fluid chamber 38. The controller 99 concurrently transmits an end time signal to the piezoelectric drive module 16, or pneumatic drive module 202, causing the valve element 14 to remain in the closed position at a predetermined second delay period after the end time to stop the jetting operation.

One advantage of supplying a jetting valve with fluid from a positive displacement pump is better "shot to shot" accuracy. This means that, for example, the same size dot can be jetted consistently, regardless of changes in parameters such as viscosity (caused by temperature changes) of the material being jetted, or fluid pressure of the material being jetted. The reason is that positive displacement pumping ensures that all material being supplied to the fluid module is jetted out of the fluid module. Thus, assuming a constant flow rate of material into the fluid module and a constant jetting frequency in dots per minute, the size of each droplet, or dot, of material jetted out of the fluid module should be the same. By contrast, in the case of a jetting valve supplied from a syringe, for example, if the pressure in the syringe increases, larger dots will be jetted, and if the pressure in the syringe drops, smaller dots will be jetted. Likewise, if the temperature of the material in the syringe drops causing the material's viscosity to increase, the dots being jetted will become smaller, and if the temperature of the material in the syringe increases causing the material's viscosity to be reduced, the dots being jetted will become larger. These variations in jetted dot, or droplet, size are reduced with the positive displacement pump embodiment of this invention.

Release Mechanism for Fluid Module and Heater

Figure 7:
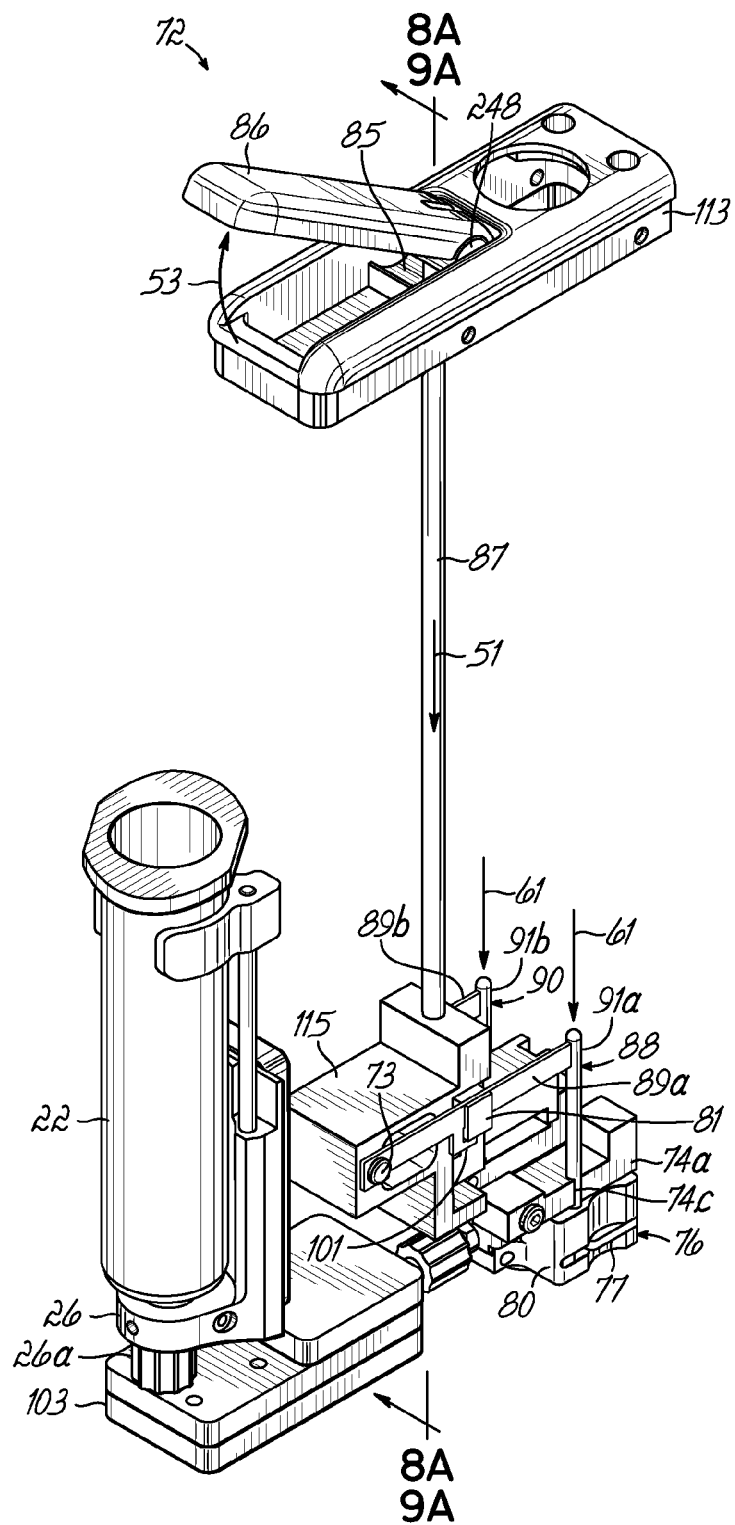
FIG. 7 is a perspective view similar to FIG. 4A, but with components removed for purposes of illustration, that illustrates the release mechanism for the fluid module.
Figure 8A:
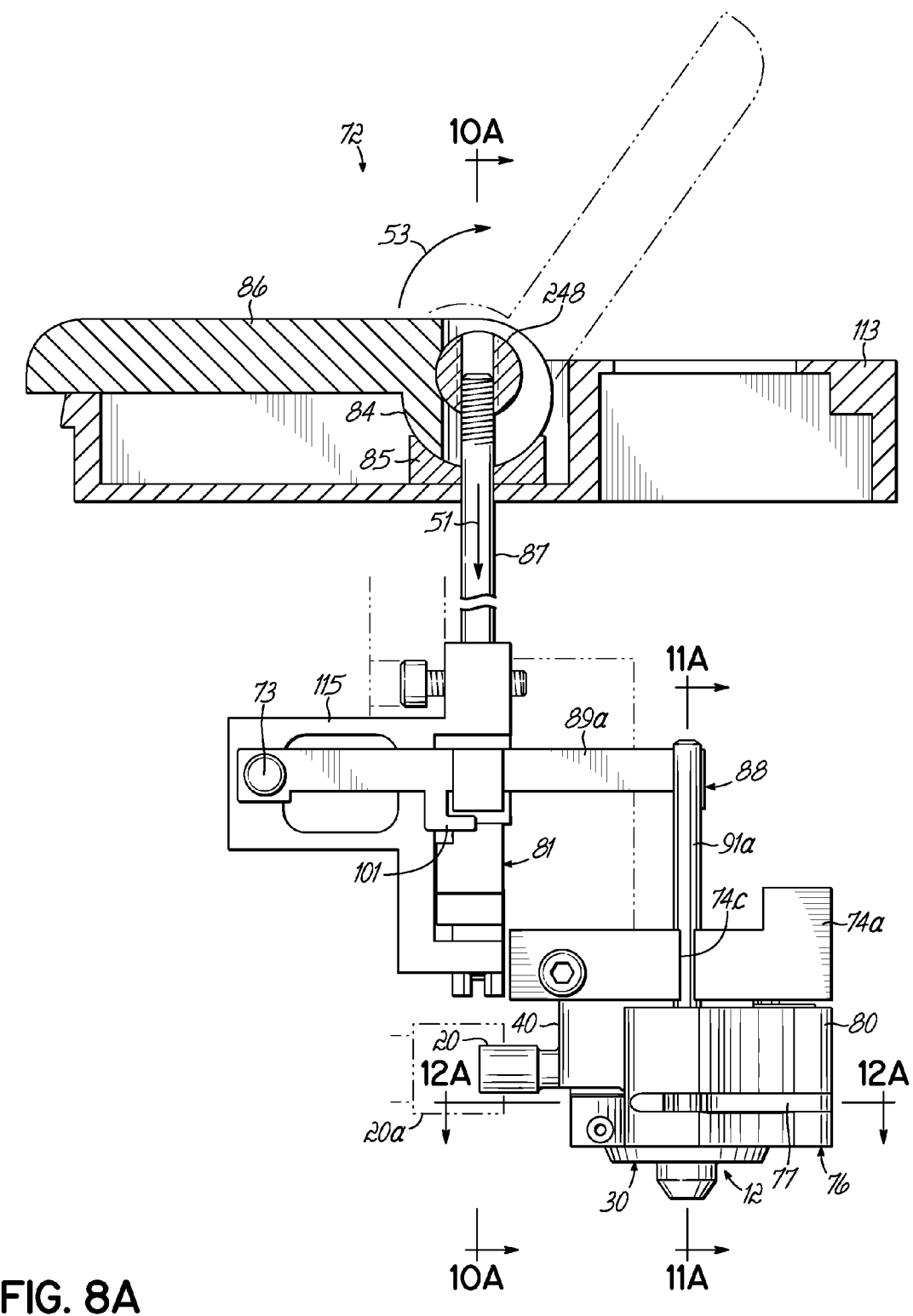
FIG. 8A is a view in partial cross section taken generally along line 8A-8A in FIG. 7.
Figure 8B:
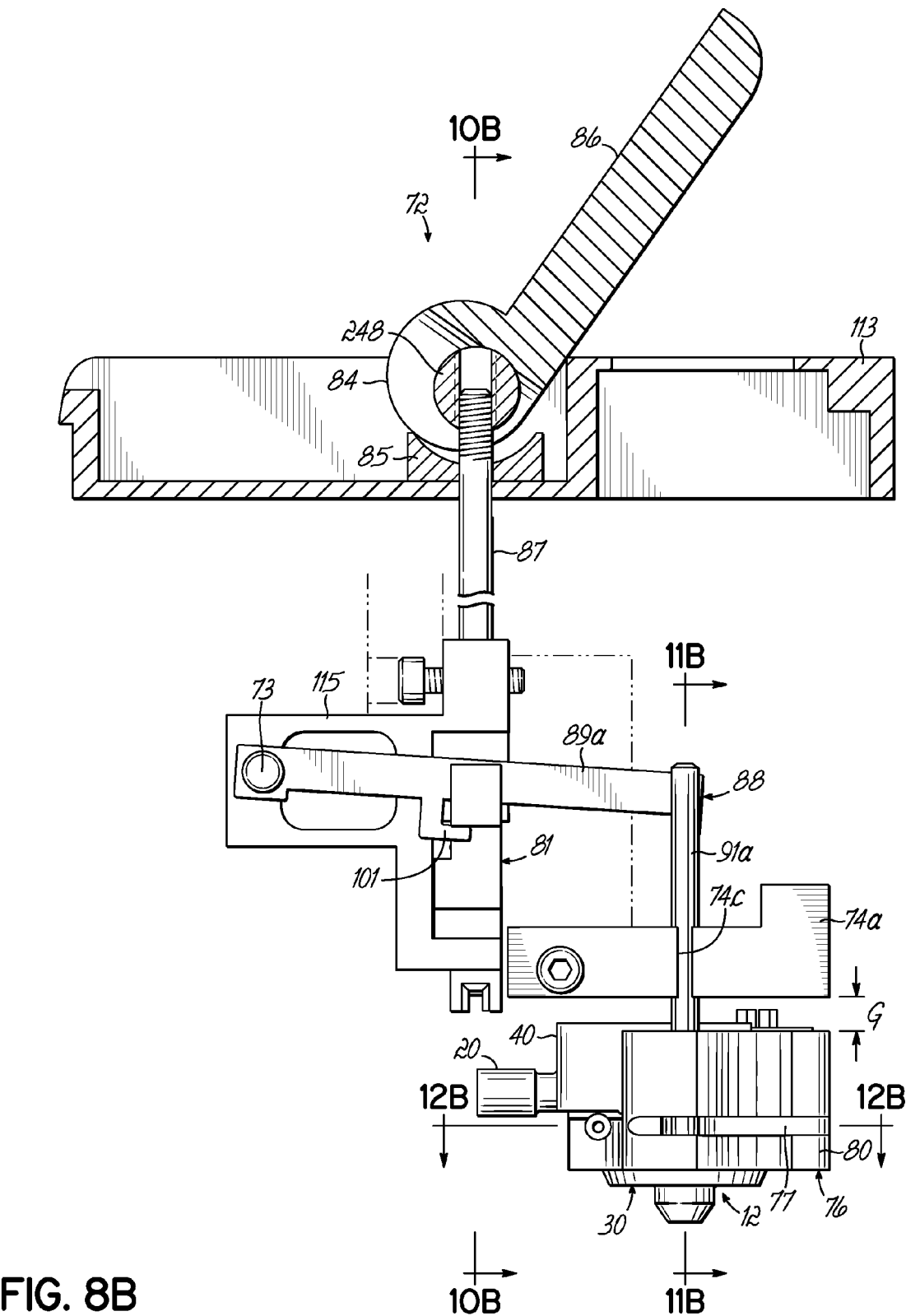
FIG. 8B is a view similar to FIG. 8A in which the lever of the release mechanism has been actuated to a position in which the fluid module is lowered relative to the actuator body.

With reference to FIGS. 7, 8A, B, 9A, B, 10A, B, 11A, B and 12A, B, which show only the components of the jetting device 10 that are involved with the release mechanism, the fluid module 12 and heater 76 of the modular jetting device 10 are configured with a release mechanism 72 that facilitates rapid attachment and removal of the heater 76 and fluid module 12 without disturbing other components of the modular jetting device 10 and without the necessity of using tools to loosen and tighten conventional fasteners. The heater 76 and fluid module 12 are movable between a raised first position (FIGS. 8A, 9A, 10A, 11A, 12A) in which the fluid module 12 is operatively coupled with the modular jetting device 10 and a lowered second position (FIGS. 8B, 9B, 10B, 11B, 12B) in which the fluid module 12 is removable from the modular jetting device 10.

With initial reference to FIGS. 7, 8A,B, 9A,B, 10A,B, 11A,B and 12A,B, the release mechanism may include a lever 86 having a cam 84 and a rod 87 that couples the cam 84 with a draw bar 81. The lever 86 is pivotally supported on the upper member 113 of the actuator body of the modular jetting device 10. The cam 84 is a smoothly curved surface that contacts a curved seat 85 and that rides on the curved seat 85 as the lever 86 is manually pivoted about pivot pin 248 between first and second positions. The rod 87 has a threaded end that is centrally coupled with the pivot pin 248 and another threaded end coupled with the draw bar 81. The cam 84 and curved seat 85 cooperate to convert rotational movement of the lever 86 into linear motion of the rod 87. The pivot pin 248 is offset laterally relative to a geometrical center of the cam 84. As the lever 86 is manually rotated about pivot pin 248 from the first position (FIGS. 7, 8A, 9A, and 10A) toward a second position (FIGS. 7, 8B, 9B, and 10B) as indicated by the single-headed arrow 53 visible on FIGS. 7, 8A and the cam 84 rides across the curved seat 85, the rod 87 moves downward as indicated by the single headed arrow visible on FIGS. 7, 8A, 9A, 10A.

When the lever 86 is manually rotated about pivot pin 248 from the second position toward the first position in the opposite rotational sense to single headed arrow 53, the rod 87 moves upward in an opposite linear direction to arrow 51. The rod 87 passes through a clearance opening 65 in the lower member 115. A spring 69, which is compressed between the draw bar 81 and the lower member 115, provides a spring bias that assists in forcing the draw bar 81 to move downward as the lever 86 is rotated about the pivot pin 248 toward the second position.

L-shaped arms 88, 90 are pivotally connected by respective pivot pins 73 to the lower member 115 and are disposed along opposite side faces of the lower member 115. The L-shaped arms 88, 90 are similar in construction. Each of the L-shaped arms 88, 90 has a respective arm segment 89a, 89b that projects away from the respective pivot point with the lower member 115. The draw bar 81 is disposed between the arm segments 89a, 89b, which extend in a parallel fashion adjacent to the opposite side faces of the draw bar 81. Each of the arm segments 89a, 89b includes a C-shaped finger 101 that is secured with a portion of the draw bar 81. As the draw bar 81 moves relative to the lower member 115, the motion of the draw bar 81 pivots the arms 88, 90 in the same rotational sense about pivot axes defined each respective pivot pins 73.

The L-shaped arm 88 has an arm segment 91a that is joined with arm segment 89a and the L-shaped arm 90 has an arm segment 91b that is joined with arm segment 89b. The arm segments 91a, 91b project in a parallel fashion transversely to arm segments 89a, 89b and are spaced apart so that the assembly of the heater 76 and the fluid module 12 can generally fit between the arms 88, 90. As best shown in FIGS. 11A and 11B, arm segment 91a passes through a slot 74c in guide member 74a and arm segment 91b passes though a slot 74d in guide member 74b. When the lever 86 is pivoted toward the second position, the draw bar 81 moves away from the lower member 115 and each of the arms 88, 90 pivots about its respective pivot pin 73 so that the arm segments 91a, 91b are downwardly displaced, as indicated by the single-headed arrows 61 (FIG. 7). Because the arm segments 91a, 91b are attached to the heater 76, as will be later described, and because the fluid module 12 sits on top of the heater 76 as previously described, the downward displacement of the arms 88, 90 lowers the fluid module 12 and heater 76 down and away from the actuator body 74. In particular, a gap, G, is formed between the actuator body 74 and the assembly comprised of the fluid module 12 and heater 76.

As best shown in FIGS. 11A, B and 12A, B, the end of arm 88 is notched with a notch 70 that is slightly spaced from the tip of arm segment 91a. Similarly, the end of arm 90 is notched with a notch 71 that is slightly spaced from the tip of arm segment 91b. The heater 76 includes slots 82, 83 that are defined in the body 80 and spring-loaded latches 77, 78 inside the slots 82, 83. The latches 77, 78 are secured to the body 80 by respective pivot pins 178, 180 that define pivot axes. The latches 77, 78 cooperate with the notches 70, 71 in the arm segments 91a, 91b of arms 88, 90 to secure heater 76 to the arms 88, 90. After the fluid module 12 and heater 76 are lowered away from the actuator body 74 to create the gap, G, the latches 77, 78 in cooperation with the notches 70, 71 continue to secure the heater 76, and the fluid module 12 sitting on top of the heater 76, to the remainder of the modular jetting device 10. The lowering of the assembly is an initiate stage of removing the fluid module 12 and heater 76.

Compression spring 148 spring biases the latch 77 outwardly from the slot 82 and into engagement with the notch 70 in the arm segment 91a of arm 88. Latch 77 is forcibly engaged with the notch 70 in arm 88 by the spring bias applied by compression spring 148 and an opposite force of greater magnitude than the spring bias must be manually applied to disengage the latch 77 from the notch 70. Compression spring 146 spring biases the latch 78 outwardly from the slot 83 and into engagement with the arms 88, 90. Latch 78 is forcibly engaged with the notch 71 in the arm segment 91b of arm 90 by the spring bias applied by compression spring 146 and an opposite force of greater magnitude than the spring bias must be manually applied to disengage the latch 78 from the notch 71. The physical contact between the latch 77 and arm 88 and the physical contact between the latch 78 and arm 90 collectively block the release of the assembly of fluid module 12 and heater 76 after the initial lowering by pivoting motion of the L-shaped arms 88, 90.

Once the assembly is lowered away from the actuator body 74, the fluid module 12 and heater 76 are removed from the modular jetting device 10 by performing additional manual actions. In the representative embodiment, an inward manual force, diagrammatically indicated by the single-headed arrows 67 (FIG. 12A), can be applied to the latches 77, 78 in a pinching or squeezing motion by the fingers of the operator's hand to release the latches 77, 78 from the notches 70, 71. Each of the latches 77, 78 includes a slot and a pin guided by the slot so that the latches 77, 78 move in an arc when the inward manual force is applied. The force applied by each of the compression springs 146, 148 opposes the inward manual force such that the lowered assembly is retained unless the inward manual force exceeds the spring biasing of the latches 77, 78 by the compression springs 146, 148. When the latches 77, 78 are manually released by this pinching motion as shown in FIGS. 11B, 12B, the obstruction is removed and the fluid module 12 and heater 76 are freed for further downward manual movement relative to the arms 88, 90 and can be manually removed as an assembly from the arms 88, 90. After the fluid module 12 and heater 76 are removed, the fluid module 12, which has a slip fit, or slight interference fit, within the central bore of the heater body 80, can be pushed out of the body 80 of heater 76 to be cleaned or replaced with an identical fluid module, or a different fluid module for a different jetting application.

Figure 9A:
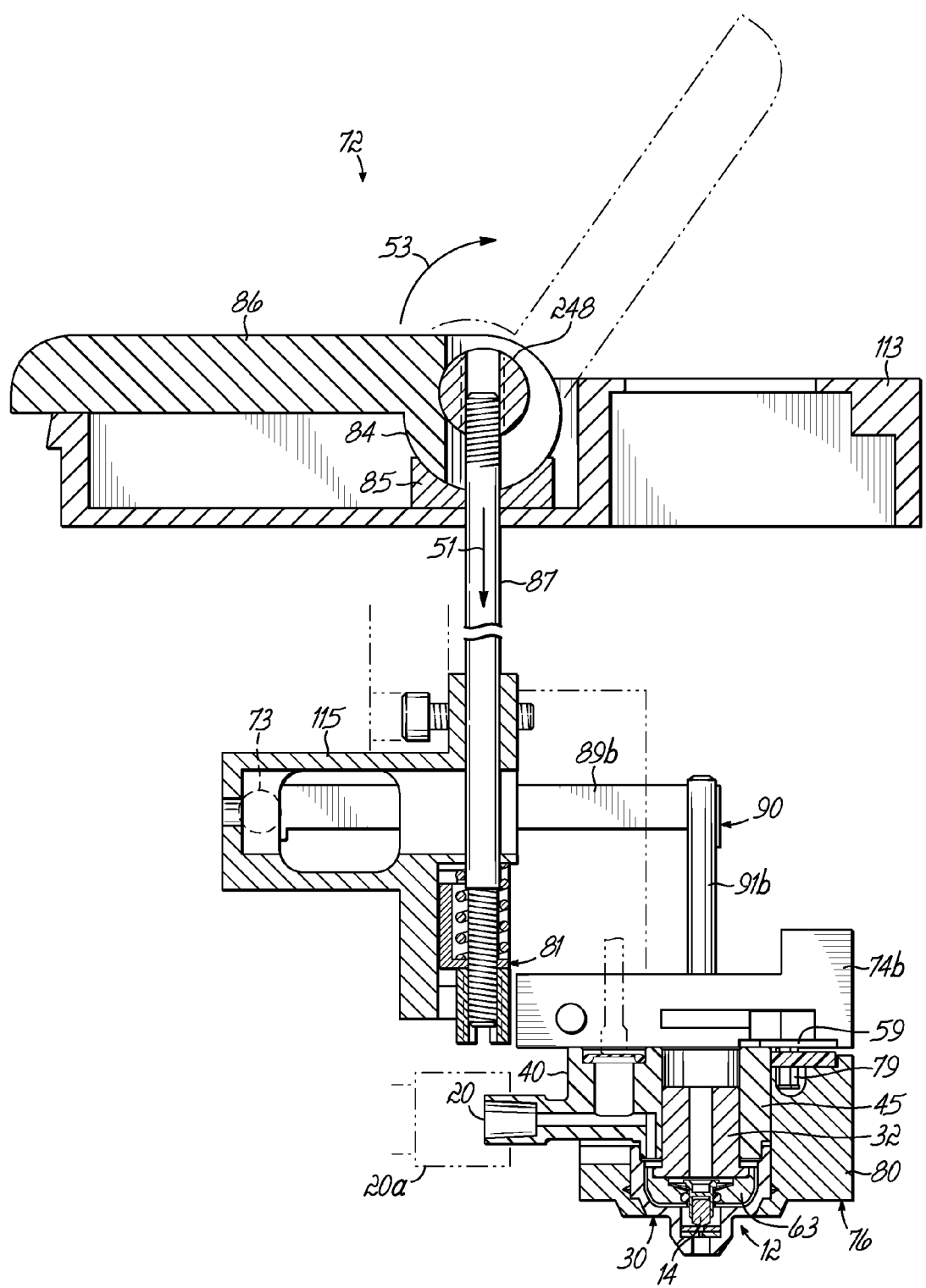
FIG. 9A is a view in cross section taken generally along line 9A-9A in FIG. 7.
Figure 9B:
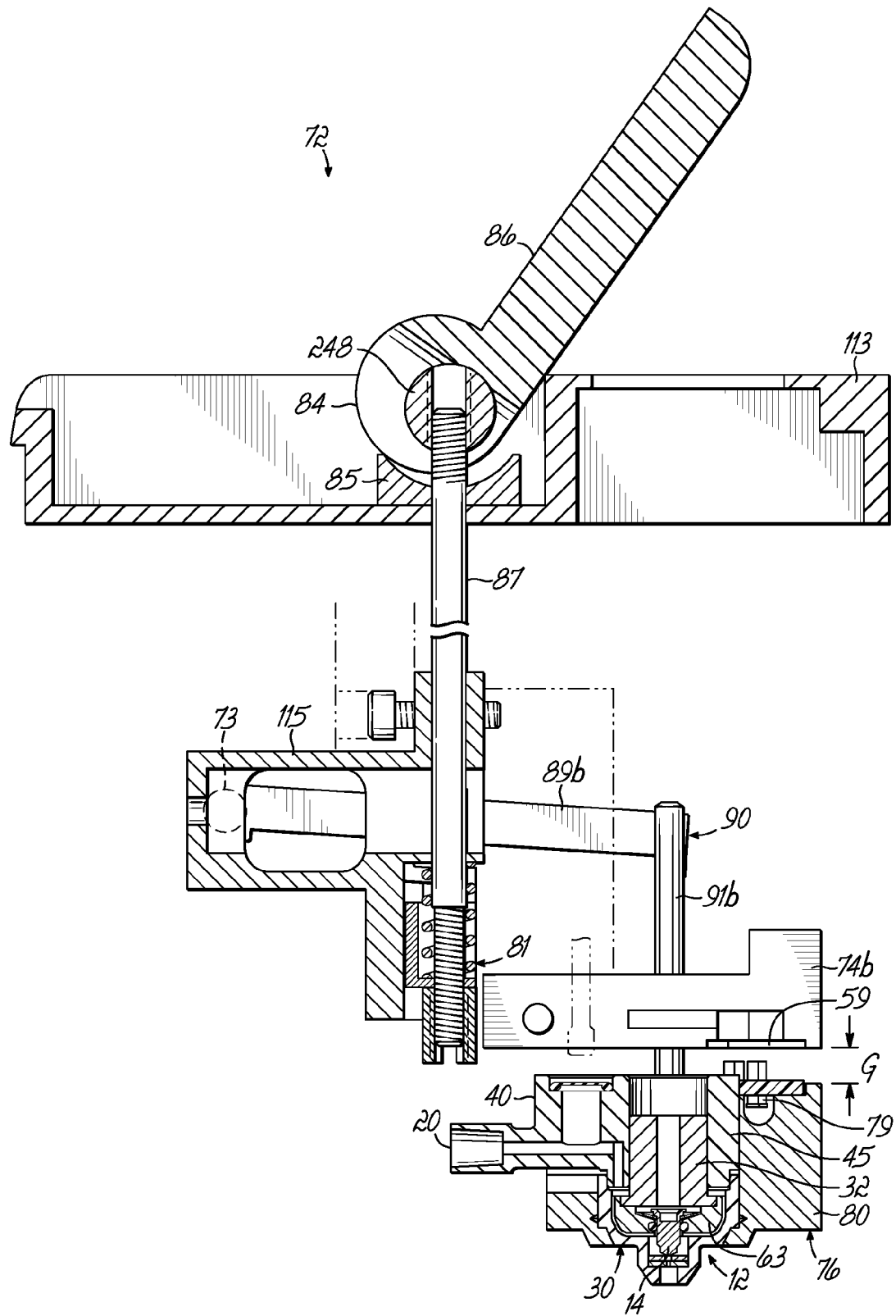
FIG. 9B is a view similar to FIG. 9A in which the lever of the release mechanism has been actuated to a position in which the fluid module is lowered relative to the actuator body.
Figure 10A:
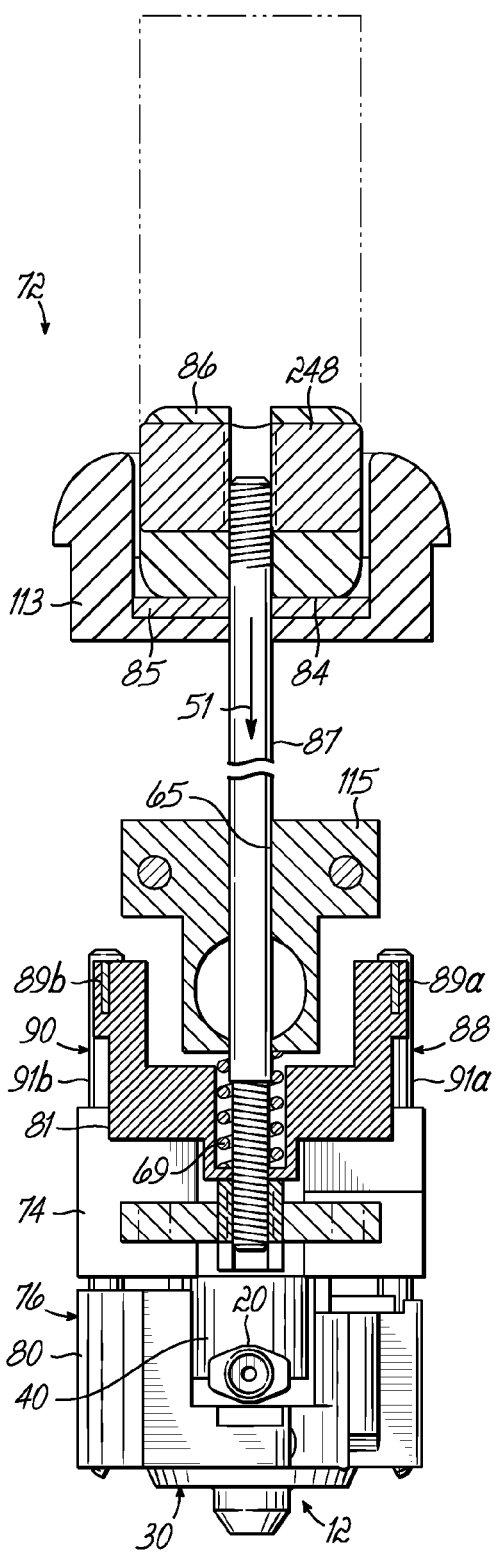
FIG. 10A is a view in partial cross section taken generally along line 10A-10A in FIG. 8A.
Figure 10B:
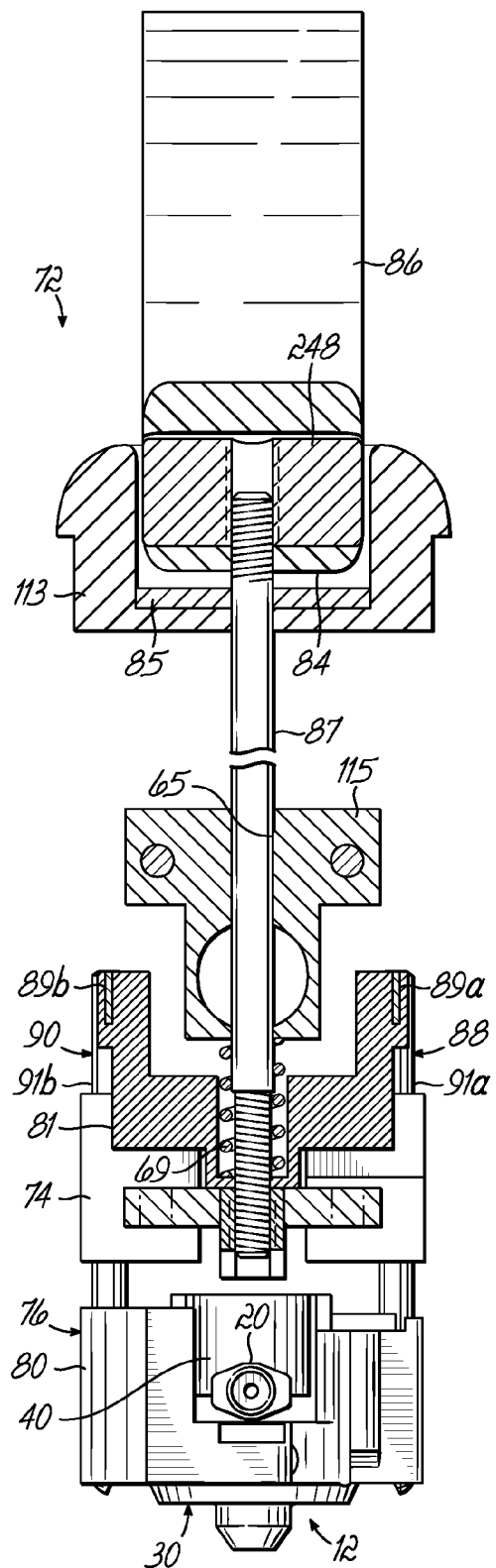
FIG. 10B is a view similar to FIG. 10A and taken generally along line 10B-10B in FIG. 8B.

To install the fluid module 12 after cleaning, the removal process is reversed. Specifically, the cleaned fluid module 12 is pushed into the body 80 of heater 76. The assembly of the heater 76 and the fluid module 12 is moved upwardly toward the piezoelectric drive module 16 and over the arms 88, 90. While pressing the latches 77, 78 so that the latches 77, 78 do not obstruct vertical movement of the assembly relative to the arms 88, 90, the assembly of the heater 76 and the fluid module 12 is raised until the heater 76 contacts the actuator body 74. The latches 77, 78 are released and the engagement between the latches 77, 78 and notches 70, 71 is verified by applying a modest downward force on the heater 76. The lever 86 is rotated to a closed position to clamp the fluid module into compressive contact with the actuator body 74. Specifically, the reverse motion of the lever 86 from the second position to the first position raises the draw bar 81, which pivots the arms 88, 90 in an opposite rotational sense to raise the heater 76 and fluid module 12 and clamp it into contact with the actuator body 74. Note that in this clamped position, the ends of the arms 89a, 89b that are opposite to pivot pins 73 deflect downwardly, like springs, to hold the heater 76 and fluid module 12 snugly into contact with the actuator body 74. In the clamped position, spring-loaded pins 79 on the heater 76 contact the respective soft, electrically conductive contacts 59 in guide block 74b, as best shown in FIG. 9A.

Figure 8C:
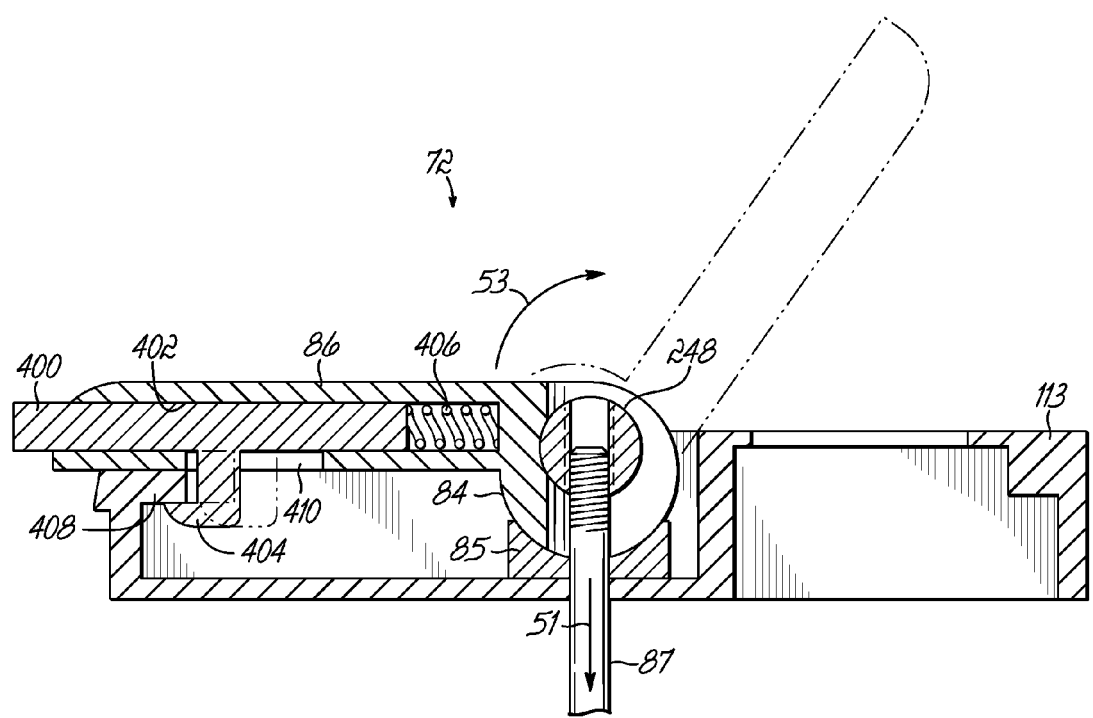
FIG. 8C shows an alternative embodiment.

In an optional embodiment, as shown in FIG. 8C, once the lever 86 has been rotated to the first position to clamp the fluid module 12 into contact with the actuator body, a positive lock feature can be activated to hold the lever 86 in the first position. For example, a spring bias catch member 400 could be slidably received within a chamber 402 in the lever 86. The member 400 includes a catch 404 on its lower side and would be biased to the left in FIG. 8C by a spring 406. As the lever 86 is rotated into the first position, the rounded lower surface of catch 404 would cause it to move to the right in FIG. 8C and compress the spring 406 until it passes through the opening 410 provided in the upper surface of upper member 113. After catch 404 passes through opening 410, the spring moves catch 404 to the left in FIG. 8C to engage the tab 408 that projects from the upper member 113. This structure automatically locks the lever 86 in the first position. To release the lever from the first position, the member 400 would be manually pushed to the right in FIG. 8C to compress spring 406 and move catch 404 to the right so that it can pass through the opening 410 in upper member 113. The lever 86 can then be moved to the second position shown by phantom lines in FIG. 8C to release fluid module 12.

Electro-Pneumatic Drive Module

Figure 13:
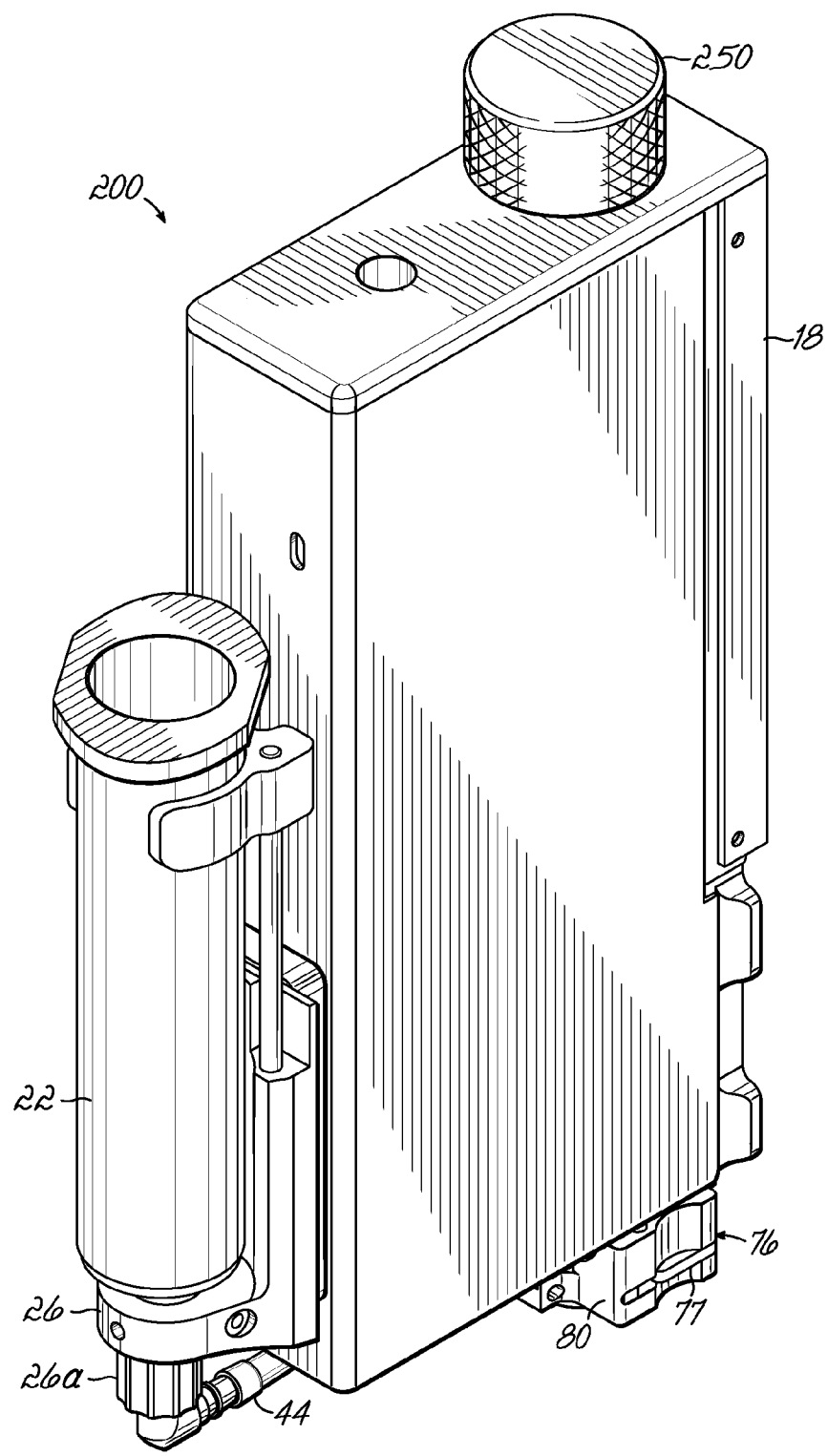
FIG. 13 is a perspective view of a modular jetting device in accordance with an alternate embodiment of the invention.
Figure 13A:
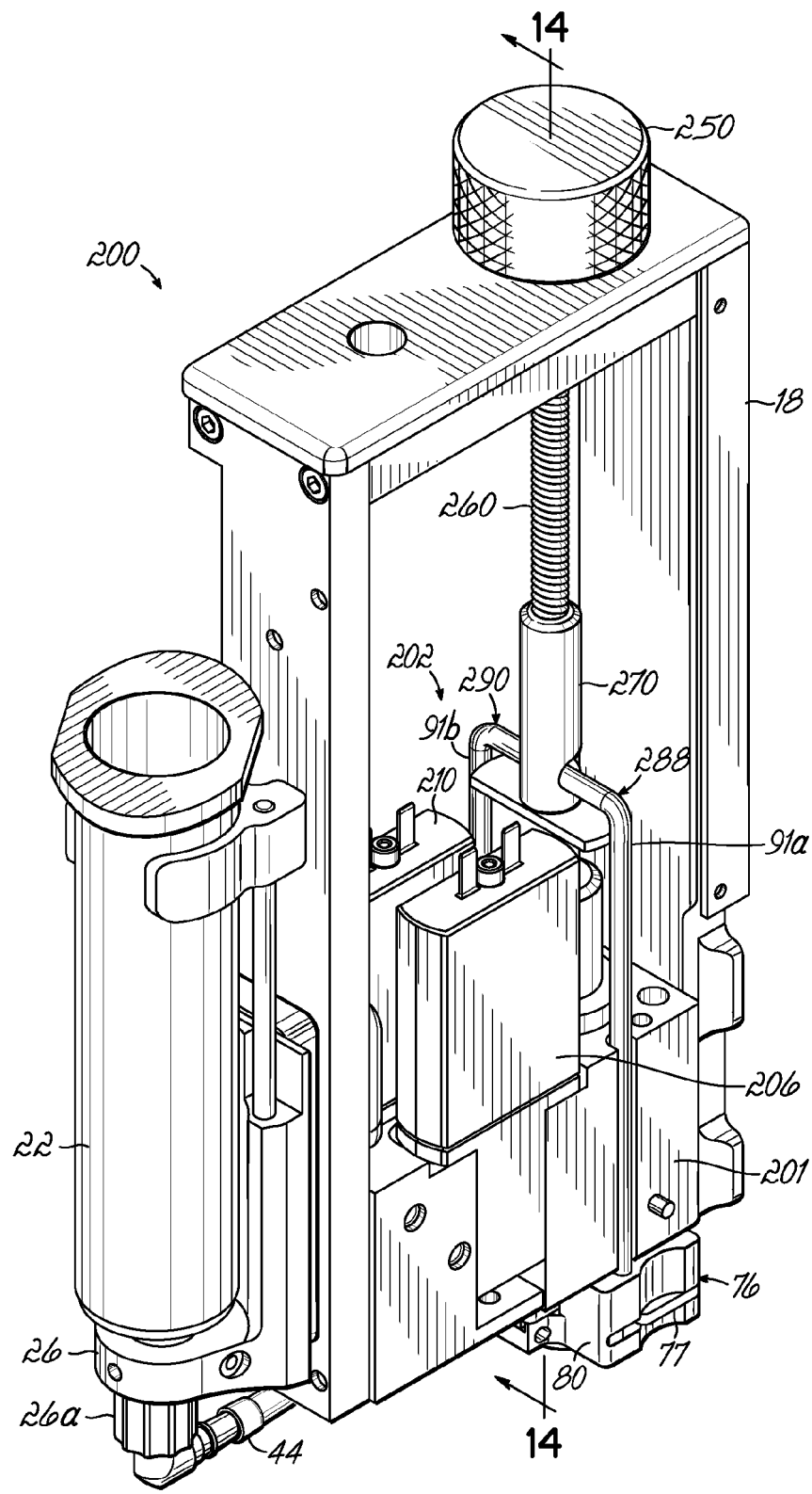
FIG. 13A is a perspective view similar to FIG. 13 in which an outer housing of the modular jetting device has been removed for purposes of description.
Figure 14:
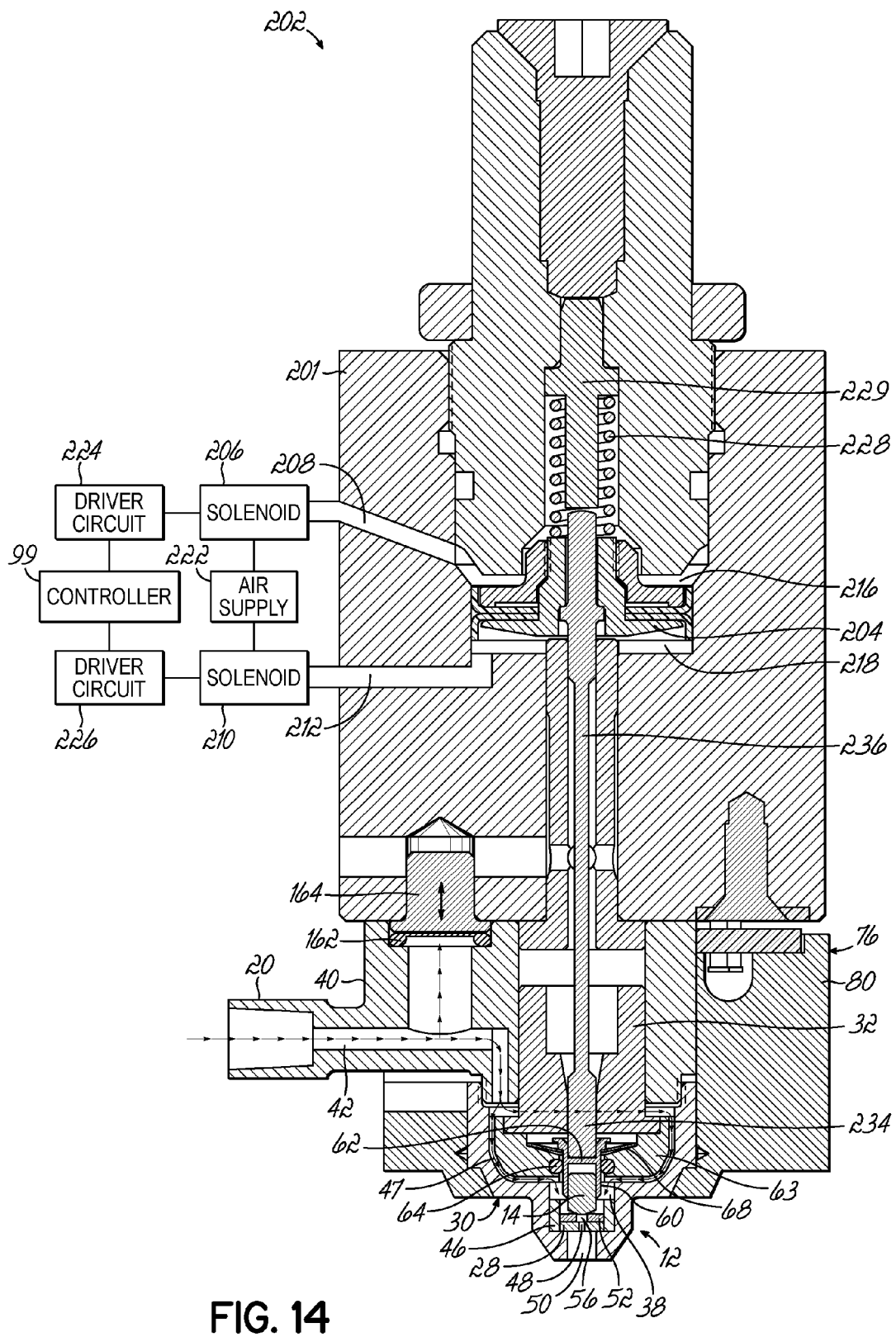
FIG. 14 is a diagrammatic cross-sectional view taken generally along line 14-14 in FIG. 13A showing only the fluid module, heater and drive module.

With reference to FIGS. 13, 13A, and 14 in which like reference numerals refer to like features in FIGS. 1-12 and in accordance with an alternative embodiment, a modular jetting device 200 includes an electro-pneumatic drive module 202 that is configured to operate by a type of different motive force than the piezoelectric drive module 16. A motive force is a force that produces or causes movement in a direction. In this instance, the movement produced or caused by the motive force is reciprocating and the moved objects are the drive pin 36, the valve element 14, and/or the movable element 60. The motive force of the electro-pneumatic drive module 202 is air pressure acting on a pneumatic piston 204 and the motive force of the piezoelectric drive module 16 is dimensional changes occurring in a piezoelectric stack 92. Depending on the model of the jetting device 10, either the piezoelectric drive module 16 or the electro-pneumatic drive module 202 is incorporated in the jetting device 10 with the fluid module 12. In either case, the design of the fluid module 12 is the same. Thus, the fluid module 12 is easily usable with either drive module.

The electro-pneumatic drive module 202 includes the pneumatic piston 204, a pair of air chambers 216, 218 separated from each other by the pneumatic piston 204, a first solenoid valve 206, and a second solenoid valve 210. The pneumatic piston 204 is physically connected with one end of the drive pin 236. The pneumatic piston 204 is movable as a function of the pressurization of the air chambers 216, 218 and, as a result, the volumes of the air chambers 216, 218 are dependent on the position of the pneumatic piston 204. The solenoid valves 206, 210 regulate the pressurization of the air chambers 216, 218. The solenoid valves 206, 210 may each be any three-way or four-way valve that operates to switch a flow of pressurized air among flow paths as understood by a person of ordinary skill in the art.

The mechanical valve of the first solenoid valve 206 is coupled by a first passageway 208 penetrating the body 201 of the drive module 202 with air chamber 216 on one side of the pneumatic piston 204. The mechanical valve of the first solenoid valve 206 is configured to port air pressure from an air supply 222 through the first passageway 208 to the air chamber 216 and to exhaust air pressure from the air chamber 216. The mechanical valve of the second solenoid valve 210 is coupled by a second passageway 212 penetrating the body of the drive module 202 with the air chamber 218 on the opposite side of the pneumatic piston 204. The mechanical valve of the second solenoid valve 210 is configured to port air pressure from the air supply 222 through the second passageway 212 to the air chamber 218 and to exhaust air pressure from the air chamber 218.

The coils of the solenoid valves 206, 210 are electrically actuated by respective driver circuits 224, 226 that are operated under the supervision of the controller 99. The driver circuits 224, 226 are of a known design with a power switching circuit providing electrical signals to the solenoid valves 206, 210, respectively. The driver circuits 224, 226 may be integrated into the construction of the solenoid valves 206, 210. In response to an electrical signal supplied to the coil of solenoid valve 206 from the driver circuit 224, the solenoid valve 206 switches the flow path in the mechanical valve so that the first passageway 208 is coupled with the air supply 222 and pressurized air flows from the air supply 222 into the air chamber 216. When the electrical signal to the coil of solenoid valve 206 is discontinued, the solenoid valve 206 switches the flow path in the mechanical valve so that an exhaust of solenoid valve 206 is coupled with the first passageway 208 and the air pressure is exhausted from air chamber 216. Thus, the mechanical valve associated with solenoid valve 206 is normally set, in the solenoids unpowered state, to vent the chamber 216 to atmosphere. Similarly, in response to an electrical signal supplied to the coil of solenoid valve 210 from the driver circuit 226, the solenoid valve 210 switches the flow path in the mechanical valve so that the second passageway 212 is coupled with the air supply 222 and pressurized air flows from the air supply 222 into the air chamber 218. When the electrical signal to the coil of solenoid valve 210 is discontinued, the solenoid valve 210 switches the flow path in the mechanical valve so that an exhaust of solenoid valve 210 is coupled with the second passageway 212 and the air pressure is exhausted from air chamber 218. Thus, the mechanical valve associated with solenoid valve 210 is likewise normally set, in the solenoids unpowered state, to vent the chamber 218 to atmosphere.

The operation of the solenoid valves 206, 210 may be coordinated to open and close the modular jetting device 200 for jetting fluid material from fluid module 12. The controller 99 may send one control signal to the driver circuit 224 for solenoid valve 206 causing air chamber 216 to be pressurized and another independent control signal to the driver circuit 226 for solenoid valve 210 causing air chamber 218 to be pressurized. The pressurization of air chamber 218 applies a force to the pneumatic piston 204, which moves the drive pin 236 away from the wall 62 of the movable element 60. The pressurization of air chamber 216 applies a force to the pneumatic piston 204, which moves the drive pin 236 toward the wall 62 of the movable element 60. When either of the control signals is absent, the corresponding one of the air chambers 216, 218 is coupled with ambient pressure as mentioned above.

A compression spring 228 is captured between a spring retainer 229 and the pneumatic piston 204. The force applied by the compression spring 228 to the spring retainer 229 acts on the pneumatic piston 204 and drive pin 236 in the same direction as the force from the air pressure in air chamber 216 acting on the pneumatic piston 204. As a result, the force of the compression spring 228 acting on pneumatic piston 204 and the force from the pressurization of air chamber 216 acting on pneumatic piston 204 are approximately collinear and in the same direction. Conversely, the force of the compression spring 228 acting on pneumatic piston 204 and the force from the pressurization of air chamber 218 acting on pneumatic piston 204 are approximately collinear and in opposite directions. Normally, since both solenoids 206 and 210 are deenergized and in that state connect their respective chambers 216, 218 to exhaust ports, spring 228 normally the only force acting on piston 204 and it pushes down on piston 204 two force drive pin 236 downwardly, which in turn forces the valve element 14 against the valve seat 52 in a closed position.

To open the valve, air pressure is supplied to chamber 218 below piston 204 which raises the piston and thereby raises the drive pin 236 out of contact with the wall 62. This causes the internal spring 68 of the fluid module to withdraw the valve element 14 from contact with the valve seat 52. To close the valve, air pressure is supplied to chamber 216 above the piston 204 which acts together with the spring 228 to push the piston downwardly to cause the drive pin 236 to contact the wall 62 to close valve element 14 against the valve seat and jet a droplet of fluid material. By repetitively opening and closing the valve in this way sequential droplets of material can be jetted. If the air pressure in chamber 218 is vented relatively quickly after air pressure is applied to chamber 216, then the piston 204 and drive pin 236 will move at a relatively high speed. If the air pressure in chamber 218 is not vented relatively quickly after air pressure is applied to chamber 216, then the piston 204 and drive pin 236 will move at a slower speed. Generally, it is best to move the drive pin 236 at a relatively faster speed when jetting more viscous, or thicker, materials to supply enough energy to cause the material to jet as a droplet, and best to move the drive pin 236 at a relatively slower speed when jetting less viscous, thinner, materials to avoid splashing of the jetted droplets on the substrate.

The computer program code in memory 172 and executing on the controller 99 can include instructions for operating the solenoid valves 206, 210. The electro-pneumatic drive module 202 may operate at a speed of 300 Hz or higher to jet droplets at 300 Hz or higher from jetting device 10.

Alternative Release Mechanism

The fluid module 12 that is used in conjunction with the modular jetting device 200 is identical to the fluid module 12 used in conjunction with modular jetting device 10 and, therefore, has the interchangeability discussed above. The fluid module 12 and heater 76 are releasable from the electro-pneumatic drive module 202 using an alternate release mechanism. In this alternate embodiment of the release mechanism, a knob 250 replaces lever 86 to moves the arms 288, 290 vertically to release the fluid module 12 and heater 76 for removal from the electro-pneumatic drive module 202.

Arms 288 and 290 include the same slots at their lower ends as arms 89a and 89b of the previously described release mechanism embodiment. Since the fluid module 12 is identical, the slots cooperate with latches 77, 78 in the same way as previously described.

To lower the fluid module 12 and heater 76 in this alternate embodiment, the knob 250 is rotated in a first direction to rotate a threaded screw 260 which is fixed to the knob 250. Rotation of the threaded screw 260 in this first direction within an internally threaded member 270 that is attached to arms 288 and 290, causes the arms 288 and 290 to move vertically downwardly to space the fluid module 12 and heater 76 from the body 201 and form a gap therebetween, that is similar to the gap G shown in FIG. 9B. The fluid module 12 and heater 76 can now be removed from the arms 288 and 290 in the same way as previously described with respect to arms 89a and 89b.

Likewise, the fluid module 12 and heater 76 can be reattached to the arms 288 and 290 in the same way as previously described with respect to arms 89a and 89b. Once attached, the knob 250 is rotated in the opposite direction to cause the screw 262 rotate in the opposite direction within the internally threaded member 270, which in turn raises the arms 288 and 290. Once the fluid module 12 is firmly in contact with the body 201, rotation of the knob 250 is stopped.

References herein to terms such as "vertical", "horizontal", "upper", "lower", "raise", "lower", etc. are made by way of example, and not by way of limitation, to establish a frame of reference. It is understood by persons of ordinary skill in the art that various other frames of reference may be equivalently employed for purposes of describing the embodiments of the invention.

It will be understood that when an element is described as being "attached", "connected", or "coupled" to or with another element, it can be directly connected or coupled to the other element or, instead, one or more intervening elements may be present. In contrast, when an element is described as being "directly attached", "directly connected", or "directly coupled" to another element, there are no intervening elements present. When an element is described as being "indirectly attached", "indirectly connected", or "indirectly coupled" to another element, there is at least one intervening element present.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "composed of", or variants thereof are used in either the detailed description or the claims, such terms are intended to be inclusive in a manner similar to the open-ended term "comprising."

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, in an alternative embodiment, the drive module used in conjunction with the modular jetting devices 10, 200 may be an electromechanical actuator that does not rely on air pressure acting on a pneumatic piston or dimensional changes induced in a piezoelectric stack as a motive force to actuate the drive pin 36. Instead, the electromechanical actuator includes an armature coupled with the drive pin 36 and an electromagnet that is driven to cause movement of the armature. Thus, the invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. A fluid module for use with a jetting device, the jetting device having a drive pin external to the fluid module that is reciprocated by an actuator, the fluid module comprising:
    a nozzle with a fluid outlet;
    a module body including a first portion with a fluid inlet, a second portion configured to support the nozzle, and a fluid chamber;
    a valve seat with an opening communicating with the fluid outlet;
    a movable element having a wall arranged to be contacted by the drive pin and configured to move when the drive pin is reciprocated;
    a sealing member in contact with an exterior of the movable element and configured to provide a fluid seal with the movable element such that a part of the movable element defines a portion of a boundary of the fluid chamber;
    a valve element enclosed within the fluid chamber between the wall of the movable element and the valve seat, the valve element attached to the movable element, and the valve element and the movable element configured to be moved in a direction toward the valve seat in response to the wall of the movable element being contacted by the drive pin, wherein the valve element is configured to cause a droplet of the fluid to be jetted from the fluid outlet when the valve element is moved in the direction toward the valve seat; and
    a biasing element contacting a periphery of the movable element, the biasing element also contacting the module body, the biasing element being configured to apply an axial spring force to the movable element such that the valve element and the movable element move away from the valve seat under the action of the axial spring force after the drive pin is reciprocated out of contact with the wall of the movable element.

2. The fluid module of claim 1, wherein a position of the valve seat is adjustable towards or away from the valve element.

3. The fluid module of claim 1, further comprising:
    a stop, wherein, after the drive pin contacts the movable element, the biasing element moves the movable element against the stop.

4. The fluid module of claim 3, wherein a position of the stop is adjustable.

5. The fluid module of claim 1, wherein the first portion of the module body includes a fluid passageway coupling the fluid inlet with the fluid chamber, the fluid module further comprising:
    a load sensor; and
    a diaphragm in communication with the fluid passageway, the diaphragm configured to receive a pressure from the fluid flowing in the fluid passageway from the fluid inlet to the fluid chamber and to transfer the pressure as a force to the load sensor.

6. The fluid module of claim 1, wherein a diameter of the opening of the valve seat is greater than a diameter of the fluid outlet of the nozzle.

7. The fluid module of claim 1, wherein an area of contact between the wall of the movable element and the drive pin is flat.

8. The fluid module of claim 1, wherein the valve element tapers to a flat surface, the flat surface engaging with the valve seat.

9. The fluid module of claim 1, wherein the fluid inlet comprises a fluid passageway having at least a portion that is perpendicular to a direction of movement of the valve element toward the valve seat.

10. The fluid module of claim 1, wherein the movable element and the valve element comprise a single unified piece.

11. The fluid module of claim 1, wherein the sealing member contacts an exterior of the movable element between a top end of the movable element and a bottom end of the movable element.

12. The fluid module of claim 1, wherein the fluid is selected from the group consisting of solder flux, solder paste, adhesive, solder mask, thermal compound, oil, encapsulant, potting compound, ink and silicone.

13. The fluid module of claim 1, wherein the sealing member is a sealing ring.

14. The fluid module of claim 1, wherein the sealing member surrounds the movable element.

* * * * *